United States Patent
Bodin et al.

(10) Patent No.: US 11,652,867 B2
(45) Date of Patent: *May 16, 2023

(54) SYSTEM AND METHOD FOR INGESTING AND PRESENTING A VIDEO WITH ASSOCIATED LINKED PRODUCTS AND METADATA AS A UNIFIED ACTIONABLE SHOPPING EXPERIENCE

(71) Applicant: rewardStyle, Inc., Dallas, TX (US)

(72) Inventors: William Kress Bodin, Austin, TX (US); Baxter Murrell Box, Dallas, TX (US); Joseph Patrick Copenhaver, Garland, TX (US)

(73) Assignee: rewardStyle, Inc., Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/821,323

(22) Filed: Aug. 22, 2022

(65) Prior Publication Data

US 2022/0400146 A1 Dec. 15, 2022

Related U.S. Application Data

(63) Continuation of application No. 17/407,338, filed on Aug. 20, 2021, now Pat. No. 11,457,059.

(60) Provisional application No. 63/068,274, filed on Aug. 20, 2020.

(51) Int. Cl.
*H04L 67/02* (2022.01)
*G06Q 50/00* (2012.01)
*G06Q 30/0251* (2023.01)

(52) U.S. Cl.
CPC ......... *H04L 67/02* (2013.01); *G06Q 30/0253* (2013.01); *G06Q 50/01* (2013.01)

(58) Field of Classification Search
None
See application file for complete search history.

(56) References Cited

U.S. PATENT DOCUMENTS

| | | | |
|---|---|---|---|
| 6,477,504 B1 * | 11/2002 | Hamlin | G06Q 30/02 455/2.01 |
| 3,006,261 A1 | 8/2011 | Haberman et al. | |
| 8,006,261 B1 * | 8/2011 | Haberman | H04N 7/173 725/35 |
| 9,083,997 B2 * | 7/2015 | Harwell | H04N 21/2408 |
| 9,113,193 B1 * | 8/2015 | Gardes | H04N 21/4113 |
| 9,430,790 B2 * | 8/2016 | Isaacson | G06F 16/951 |

(Continued)

FOREIGN PATENT DOCUMENTS

EP 2725541 A1 4/2014

OTHER PUBLICATIONS

International Search Report dated Jul. 12, 2021 in corresponding International Application No. PCT/2021/046908 (3 pages).

*Primary Examiner* — Lashonda Jacobs-Burton

(74) *Attorney, Agent, or Firm* — Bookoff McAndrews, PLLC

(57) ABSTRACT

A computer-implemented method for ingesting and presenting a video with associated linked products and metadata as a unified actionable shopping experience may include accessing a video file, receiving information about an object, the information including a link to a merchant portal or web page through which the object may be purchased, combining the video file and information about the object into a social media post, and delivering the social media post to consumers.

16 Claims, 19 Drawing Sheets

(56) References Cited

U.S. PATENT DOCUMENTS

| | | |
|---|---|---|
| 9,767,520 B2 * | 9/2017 | Isaacson ............ G06Q 30/0625 |
| 10,187,687 B2 * | 1/2019 | Harb ..................... H04N 21/84 |
| 10,735,784 B2 * | 8/2020 | Lee ................. H04N 21/23424 |
| 11,140,434 B1 * | 10/2021 | Aher .................... H04N 21/472 |
| 2004/0044565 A1 * | 3/2004 | Kumar ................. G06Q 30/02 |
| | | 705/14.57 |
| 2011/0078623 A1 | 3/2011 | Liu et al. |
| 2011/0137753 A1 * | 6/2011 | Moehrle .......... H04N 21/47815 |
| | | 725/60 |
| 2013/0046781 A1 * | 2/2013 | Frankel ................. G06Q 30/02 |
| | | 707/769 |
| 2013/0283301 A1 * | 10/2013 | Avedissian ......... H04N 21/4722 |
| | | 725/5 |
| 2014/0214533 A1 * | 7/2014 | Box ................... G06Q 30/0251 |
| | | 705/14.49 |
| 2014/0229270 A1 * | 8/2014 | Rashwan ........... G06Q 30/0277 |
| | | 705/14.43 |
| 2015/0245103 A1 * | 8/2015 | Conte ................. G06Q 30/0643 |
| | | 725/60 |
| 2016/0307249 A1 * | 10/2016 | Ku ..................... G06Q 30/0613 |
| 2018/0144371 A1 | 5/2018 | Box et al. |
| 2018/0359510 A1 * | 12/2018 | Harwell ............. H04N 21/2408 |
| 2018/0367826 A1 * | 12/2018 | Lee ................. H04N 21/47205 |
| 2019/0306137 A1 * | 10/2019 | Isaacson ............ G06Q 30/0625 |
| 2020/0111173 A1 * | 4/2020 | Benfield ............. G06F 16/4393 |

\* cited by examiner

SYSTEM AND METHOD FOR INGESTING AND PRESENTING A VIDEO WITH ASSOCIATED LINKED PRODUCTS AND METADATA AS A UNIFIED ACTIONABLE SHOPPING EXPERIENCE

CROSS-REFERENCE TO RELATED APPLICATION(S)

This patent application is a continuation of and claims the benefit of priority to U.S. application Ser. No. 17/407,338, filed on Aug. 20, 2021, now issued as U.S. Pat. No. 11,457,059 on Sep. 27, 2022, which claims priority to U.S. Provisional Application No. 63/068,274, the entireties of which are incorporated herein by reference.

TECHNICAL FIELD

Various embodiments of the present disclosure relate generally to online promotion of items in conjunction with social networking and, more particularly, to optimizing object placement in online video to enhance viewer discoverability and actionability of the depicted objects.

BACKGROUND

Businesses create marketing campaign advertisements to market products to various consumer demographics in the hopes of convincing some percentage of the consumers to purchase particular products. However, such mass advertisements are costly and relatively ineffective unless interested potential consumers receive information regarding the goods or services in which they are interested. Given the finite budgets involved, it is usually the job function of marketing personnel to obtain sufficient data to assist them in their determination as to which consumers to target with the advertisement.

It is commonly understood in business advertising that if it is possible to accurately determine a potential consumer's desire for or interest in a particular product and provide that consumer with the relevant information regarding that particular product when the desire or interest is greatest, then the chance of the consumer acting on this desire or interest and making the purchase is much greater than if the information is not received, is incorrect, or arrives at a time when interest is low or non-existent. The more certain the desire or interest can be determined, then the higher the probability of a completed sale. Such an advertising technique is known as targeted marketing, which may require adequate, essentially real-time, consumer information to realize. Thus, actively monitoring a potential consumer's actions, desires, and interests as they occur and develop would be an ideal way of achieving such information, but such effective data gathering is effectively non-existent despite current technology advances.

With the rapid evolution of technology there has been a growing trend toward online publishing by individuals through social media. Popular social media networking websites, for example, Instagram, Facebook, Twitter, P interest, YouTube, Snapchat, TikTok, etc. allow users to post user-generated or acquired images and comments effectively at will. And, because camera-enabled smartphones are ubiquitous, it is relatively simple for social media users to take and post digital photographs and video on these websites and to include commentary. Once posted, subscribers or "friends" of the individual's posts are allowed to comment on the posts or otherwise rank such posts to indicate the level of "like" that they share. Such information—ranking by these subscribers or "friends" of particular posts—is invaluable in determining what the subscriber or "friend" is not only interested in, but also when such interest is effectively the greatest. However, efficient access to this information does not exist in current online systems and applications.

One highly relevant exemplar of use of social media networks involves publishers in the fashion industry, who often share images of favorite clothing, shoe, and/or accessory fashion items. Such fashion publishers enjoy sharing clothing and accessory "finds" with others through these social media network websites. Upon posting of, for example, a particularly attractive combination of clothing and accessories, subscribers to the publisher's posts receive notification of such posts and will browse and rank the posted image. In addition to browsing and ranking images and videos, it can be desirable to enable users to proceed to shop (i.e., browse and/or purchase) products featured in those images and videos, by clicking or otherwise selecting formatted URL links to shopping carts and other e-commerce landing pages. Thus, the subscriber demonstrates their interests by shopping products in the app, or at least records his or her current like or dislike of the clothing and accessories. Near real time, granular access to this data would allow marketers of the particular clothing and accessories to present timely relevant advertisements to the subscriber, but such efficiency has not been possible through conventional methods.

Furthermore, the identification, location, and tagging of promoted items in videos is commonly an expensive and time-consuming manual process. This may make the enhancement of such videos to promote the discovery of featured items difficult. Failure or inability to make such enhancements may reduce sales and revenue to the producers and promoters of the videos.

The present disclosure is directed to overcoming one or more of these above-referenced challenges.

SUMMARY OF THE DISCLOSURE

According to certain aspects of the present disclosure, systems and methods are disclosed for ingesting and presenting a video with associated linked products and metadata as a unified actionable shopping experience.

In one embodiment, a computer-implemented method is disclosed for ingesting and presenting a video with associated linked products and metadata as a unified actionable shopping experience, the method comprising: accessing a video file, receiving information about an object, the information including a link to a merchant portal or web page through which the object may be purchased, combining the video file and information about the object into a social media post, and delivering the social media post to consumers.

In accordance with another embodiment, a system is disclosed for ingesting and presenting a video with associated linked products and metadata as a unified actionable shopping experience, the system comprising: a data storage device storing instructions for ingesting and presenting a video with associated linked products and metadata as a unified actionable shopping experience in an electronic storage medium; and a processor configured to execute the instructions to perform a method including: accessing a video file, receiving information about an object, the information including a link to a merchant portal or web page through which the object may be purchased, combining the video file and information about the object into a social media post, and delivering the social media post to consumers.

In accordance with another embodiment, a non-transitory machine-readable medium storing instructions that, when executed by the a computing system, causes the computing system to perform a method for ingesting and presenting a video with associated linked products and metadata as a unified actionable shopping experience, the method including: accessing a video file, receiving information about an object, the information including a link to a merchant portal or web page through which the object may be purchased, combining the video file and information about the object into a social media post, and delivering the social media post to consumers.

Additional objects and advantages of the disclosed embodiments will be set forth in part in the description that follows, and in part will be apparent from the description, or may be learned by practice of the disclosed embodiments. The objects and advantages of the disclosed embodiments will be realized and attained by means of the elements and combinations particularly pointed out in the appended claims.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF EMBODIMENTS

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section.

Figure 1:
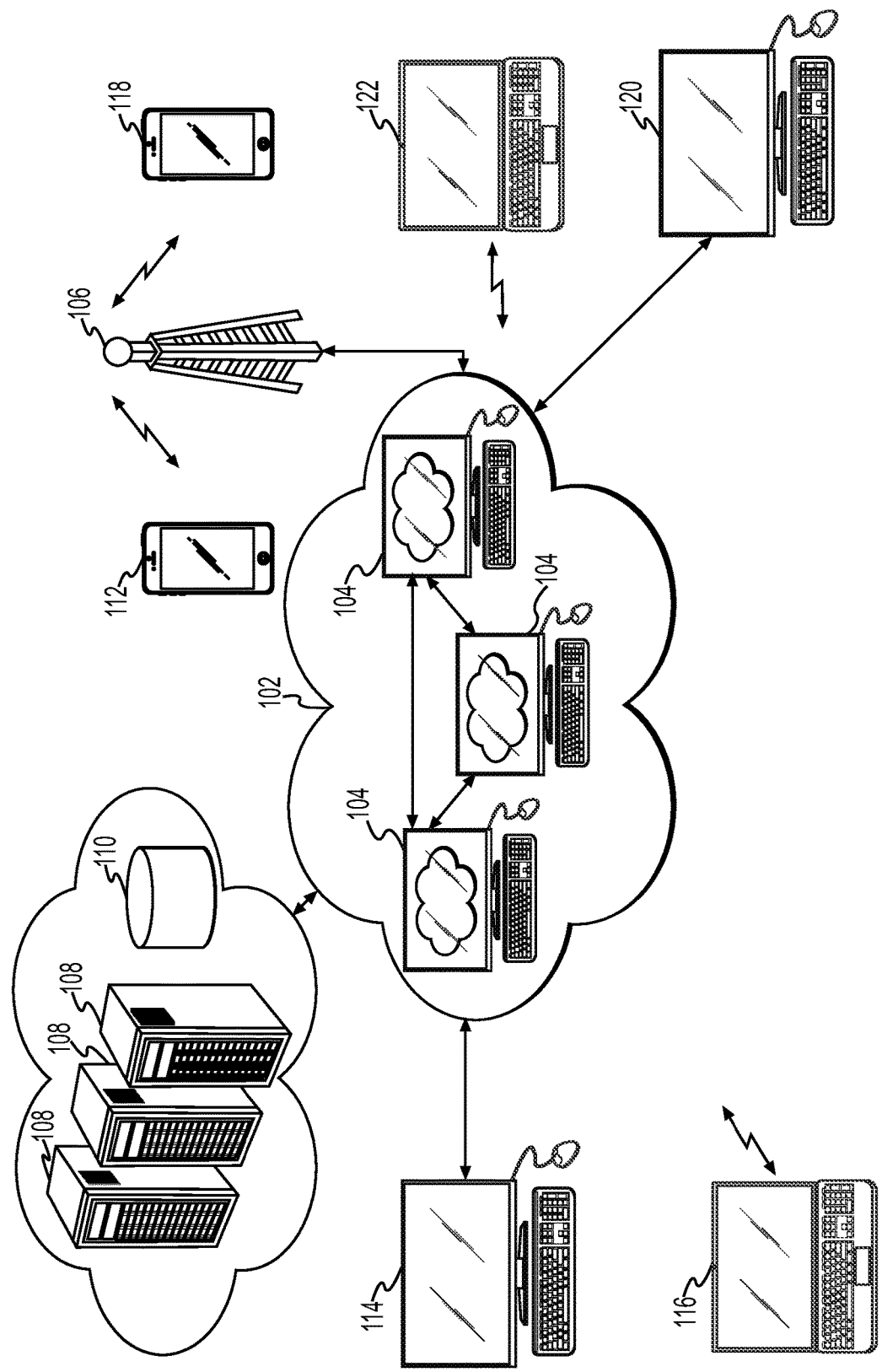
FIG. 1 depicts an exemplary system infrastructure for ingesting and presenting a video with associated linked products and metadata as a unified actionable shopping experience, according to one or more embodiments.
Figure 2:
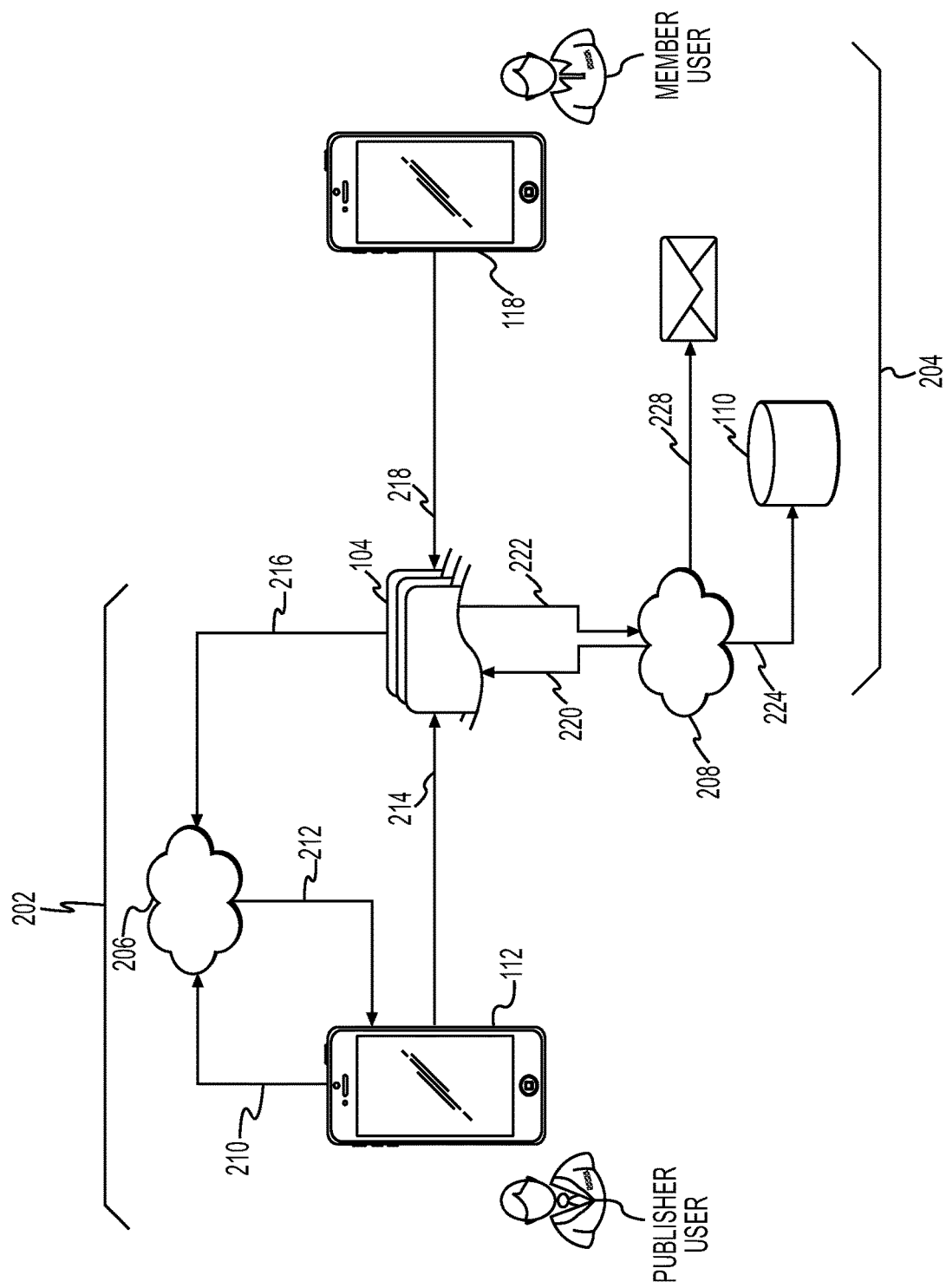
FIG. 2 depicts an overall process flow of a system for ingesting and presenting a video with associated linked products and metadata as a unified actionable shopping experience, according to one or more embodiments.

Any suitable system infrastructure may be put into place to allow for the hosting and delivery of video related shopping content and in further deriving object placement in video and optimizing video playback for object discovery. FIGS. 1 and 2 and the following discussion provide a brief, general description of a suitable computing environment in which the present disclosure may be implemented. In one embodiment, any of the disclosed systems, methods, and/or graphical user interfaces may be executed by or implemented by a computing system consistent with or similar to that depicted in FIGS. 1 and 2. Although not required, aspects of the present disclosure are described in the context of computer-executable instructions, such as routines executed by a data processing device, e.g., a server computer, wireless device, and/or personal computer. Those skilled in the relevant art will appreciate that aspects of the present disclosure can be practiced with other communications, data processing, or computer system configurations, including: Internet appliances, hand-held devices (including personal digital assistants ("PDAs")), wearable computers, all manner of cellular or mobile phones (including Voice over IP ("VoIP") phones), dumb terminals, media players, gaming devices, virtual reality devices, multi-processor systems, microprocessor-based or programmable consumer electronics, set-top boxes, virtual personal assistants (VPA's), network PCs, mini-computers, mainframe computers, and the like. Indeed, the terms "computer," "server," and the like, are generally used interchangeably herein, and refer to any of the above devices and systems, as well as any data processor.

Aspects of the present disclosure may be embodied in a special purpose computer and/or data processor that is specifically programmed, configured, and/or constructed to perform one or more of the computer-executable instructions explained in detail herein. While aspects of the present disclosure, such as certain functions, are described as being performed exclusively on a single device, the present disclosure may also be practiced in distributed environments where functions or modules are shared among disparate processing devices, which are linked through a communications network, such as a Local Area Network ("LAN"), Wide Area Network ("WAN"), and/or the Internet. Similarly, techniques presented herein as involving multiple devices may be implemented in a single device. In a distributed computing environment, program modules may be located in both local and/or remote memory storage devices.

Aspects of the present disclosure may be stored and/or distributed on non-transitory computer-readable media, including magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data under aspects of the present disclosure may be distributed over the Internet and/or over other networks (including wireless networks), on a propagated signal on a propagation medium (e.g., an electromagnetic wave(s), a sound wave, etc.) over a period of time, and/or they may be provided on any analog or digital network (packet switched, circuit switched, or other scheme).

The system and method is practiced on one or more networked computing devices. As used herein, the term "automated computing device" or "computing device" or "computing device platform" means a device capable of executing program instructions as streamed or as requested from attached volatile or non-volatile memory. For example, such a device utilizes a microprocessor, microcontroller, or digital signal processor in signal communication with a dedicated and/or shared memory component (RAM, ROM, etc.), one or more network components (NIC, Wi-Fi, Bluetooth, Zigbee, etc.), one or more user input components (keyboard, mouse, touchscreen, etc.), one or more user output or display components, and/or additional peripheral components including a database for bulk data storage. The computing device may also utilize a standard operating system upon which the program instructions may be executed (OS X, iOS, Linux, UNIX, Android, Windows, etc.) or may utilize a proprietary operating system for providing basic input/output. For purposes of illustration but not limitation, examples of a computing device include mainframe computers, workstation computers, database servers, personal computers, laptop computers, notebook computers, tablet computers, smartphones, personal digital assistants (PDAs), or the like, or even some combination thereof.

As used herein "computer readable medium" means any tangible portable or fixed RAM or ROM device, such as portable flash memory, a CDROM, a DVDROM, embedded RAM or ROM integrated circuit devices, or the like. A "data storage device" or "database device" means a device capable of persistent storage of digital data, for example, a computer database server or other computing device operating a relational database management system (RDBMS), for example, SQL, MySQL, Apache Cassandra, or the like, or even a flat file system as commonly understood.

As used herein, the term "network" or "computer network" means any digital communications network that allows computing devices to exchange data over wired and/or wireless connections, including the telecommunications infrastructure. Such a network also allows for distributed processing, for example, through website and database hosting over multiple computer network connected computing devices. The present invention may utilize one or more such networked computing devices, with each device physically residing in different remote locations, including in the "cloud" (i.e., cloud computing). As used herein, the term "online" means, with respect to a computing device, that the computing device is in computer network communication with one or more additional computing devices. The term "online" means, with respect to a user of a computing device, that the user is utilizing the computing device to access one or more additional computing devices over a computer network.

As used herein, the term "computer network address" or "network address" means the uniform resource identifier (URI) or unique network address by which a networked computer may be accessed by another. The URI may be a uniform resource locator (URL), a uniform resource name (URN), or both, as those terms are commonly understood by one of ordinary skill in the information technology industry.

As used herein, the term "web browser" means any software application for retrieving, presenting, or traversing digital information over a network (e.g., Safari, Firefox, Netscape, Internet Explorer, Chrome, and the like). A web browser accepts as an input a network address, and provides a page display of the information available at that network address. Underlying functionality includes the ability to execute program code, for example, JavaScript or the like, to allow the computing device to interact with a website at a given network address to which the browser has been "pointed."

As used herein, the term "digital media" means any form of electronic media where media data are stored in digital format. This includes, but is not limited to, video, still images, animations, audio, any combination thereof, and the like. The term "rank" or "ranking" of the digital media means the assignment of a value by one viewing the digital media that indicates the one's approval or disapproval, or acceptance, of the digital media. For example, most social media network services allow a user viewing a posted digital media to indicate whether the viewer "likes" the posted digital media by allowing the selection of a "like" button (or other such graphical user input device) associated with the digital media. The social media network service records and persists this "like" ranking in a dedicated database as a use metric, associating the ranking with the posted digital media and attributing the ranking with the member user. Also collected as a metric by social media network services are the digital media views by the member users. Thus, an inference may be made that a user that views a particular digital media without assigning a "like" ranking either does not like the digital media or is ambivalent towards the particular digital media. In addition to or alternatively, social media network services may allow a value ranking by, for example, allowing a member user to assign a multiple star value (e.g., 0 to 5 stars) or a number range (e.g., 0 to 10), with the higher star count or number range indicating a greater or lesser approval or acceptance of the digital media.

The method steps and computing device interaction described herein are achieved through programming of the computing devices using commonly known and understood programming means. For example, stored programs consisting of electronic instructions compiled from high-level and/or low-level software code using industry standard compilers and programming languages, or may be achieved through use of common scripting languages and appropriate interpreters. The method steps operating on user computing devices may utilize any combination of such programming language and scripting language. For example, compiled languages include BASIC, C, C++, C#, Objective-C, Java, .NET, Visual Basic, and the like, while interpreted languages include JavaScript, Perl, PHP, Python, Ruby, VBScript, and the like. For network communications between devices, especially over internet TCP/IP connections, web browser applications and the like may use any suitable combination of programming and scripting languages, and may exchange data using data interchange formats, for example, XML, JSON, SOAP, REST, and the like. One of ordinary skill in the art will understand and appreciate how such programming and scripting languages are utilized with regard to creating software code executable on a computing device platform.

FIG. 1 depicts the overall hardware and network architecture as practiced by a first embodiment of the invention. As shown, the system utilizes a network connection to a computer network (102), which in the present embodiment is a commonly known Internet connection. Also enjoying a network connection to the computer network (102) are one or more social media network services (104). The social media network services include any online social media network service that accepts the posting of digital media, and allows others to browse the posted digital media and to apply a ranking to the browsed posted digital media. Examples of social media network services include, but are not limited to, Instagram, Facebook, Twitter, Pinterest, YouTube, SnapChat, TikTok, and LikeToKnowIt.

The social media network services utilized by the embodiment also operate upon automated computing devices providing such functionality through execution of stored program software code and afford third-party access to the service through an application programming interface (API). For example, the Instagram API allows registered third-party access to posted digital media, captions and related metadata (including "likes" of the posted digital media), real-time digital media updates, and other data. One of ordinary skill will readily understand how such API calls may be utilized to obtain the desired data, and will be readily capable of incorporating such API calls into proprietary software functions designed for such access. Each of the listed example social media network services affords such an API and access to at least certain of its data and metadata. In addition to commonly known and practiced wired (Ethernet or the like) and/or wireless (Wi-Fi and the like) access to the network (102) also includes cellular networks (106), thereby affording access to the social media networking services using handheld computing device cellular phones (112), tablets (118), and the like.

The system computing devices (108) and data storage devices (110) are connected to the network (102) to access the social media network services (104) using the provided APIs. The system functionality described herein may be provided on one or more computing devices (108), depending on system requirements. For example, system requirement considerations to determine the number and power of computing (108) and data storage (110) hardware utilized include, without limitation, budgetary constraints, number of actual or anticipated users, failover, redundancy for continuity of service, etc., and are within the skill of one of ordinary skill.

The system (108) can be accessed by publisher users using wired desktop or personal computing device (114), wirelessly connected computing device (116), and/or cellular handheld computing device (112) access means, such means operable to provide network access to the system (108) and social media network services (104) through a web browser. In another embodiment a dedicated graphical user interface (GUI) may also be provided. Social media network member users can also access the system (108) through the same wired (120), wireless (122), and/or cellular handheld device (118) access means. Each publisher user and social media network member user computing device is capable of receiving program code over the network (102) connection through the device web browser or as a download from an application service provider or other such service. Such devices are considered peripheral to the system devices (108 and 110).

FIG. 2 is a depiction of the overall process flow of the embodiment, highlighting the high-level interaction among the users, system, and peripheral devices. The diagram is divided to highlight activities related to the information unique identifier creation device (202) processes and the digital media ranking monitor device and communications device (204) processes. The information unique identifier creation device (206), which is in network communication with the social media network service computing device (104), communicates with a publisher user's handheld computing device (112) as previously described, following download of the program code as an application from an application provider (for example, the Apple™ App Store) and authentication of the publisher user's social media network service account as described in additional detail below. Using the installed and authenticated application, the publisher user (112) selects a digital media from its device (112) for sharing on the social media network service (104) and provides a caption for same. The selected digital media and caption are shared (210) with the information unique identifier creation device (206) of the system, which generates and returns an information unique identifier in response (212). The publisher user then posts this digital media and related information unique identifier (214) on the social media network service (104) for member users to access and rank. Upon posting, the social media network service (104) notifies the system of the posted image and any modifications thereto (216) for persistent storage of same in the system data storage device. Products featured in the posted images or videos may then be shopped by consumer users of the mobile application, from directly within the mobile application, as described in more detail herein.

A member user's handheld computing device (118) that is also registered with the social media network service (104) accesses the posted digital media on the social media network service (104) and provides a "ranking" of the digital media (218). The system digital media ranking monitor device (208) of the system periodically accesses the social media network service (104) to request a report of the digital media rankings (220), which the service (104) subsequently provides (222). This received ranking and digital media information is then persisted in the data storage device (110) for subsequent storage and processing. The communications device (208) of the system periodically sends targeted marketing information to the member user that is relevant to the member user's digital media rankings (228) and purchases.

Figure 3:
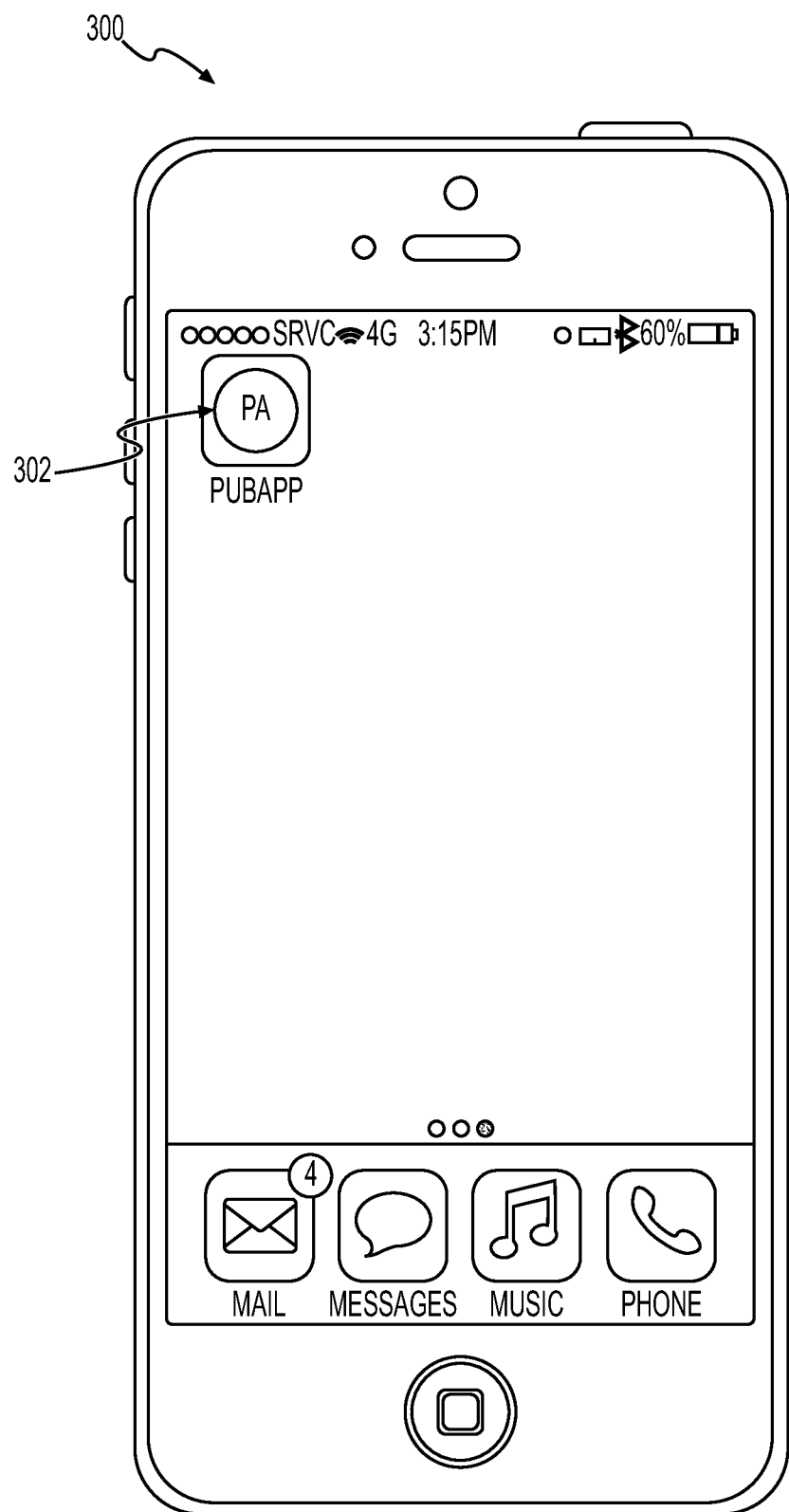
FIG. 3 depicts a screen of a publisher user handheld computing device depicting an application start screen, according to one or more embodiments.

FIG. 3 is a depiction of the screen of a publisher user handheld computing device (300) depicting the application start screen as provided by an embodiment. Shown is the start screen of the downloaded handheld computing device application portion of the system. Once downloaded, the application icon (302) appears on the publisher user's screen. Upon selecting the icon to start the application, the publisher user is presented with the system start screen.

Figure 4:
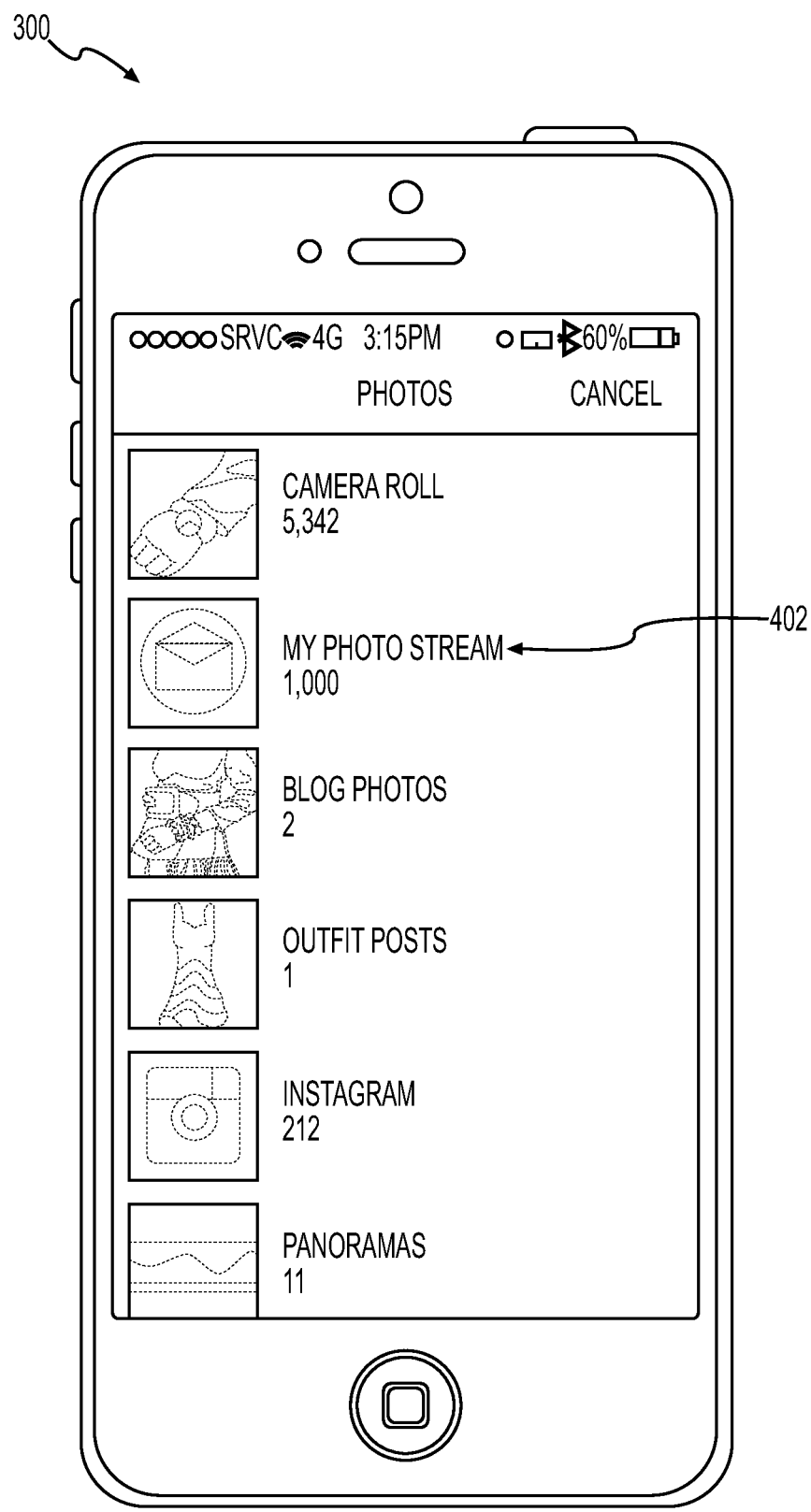
FIG. 4 depicts a screen of a publisher user handheld computing device depicting a media folder screen, according to one or more embodiments.
Figure 5:
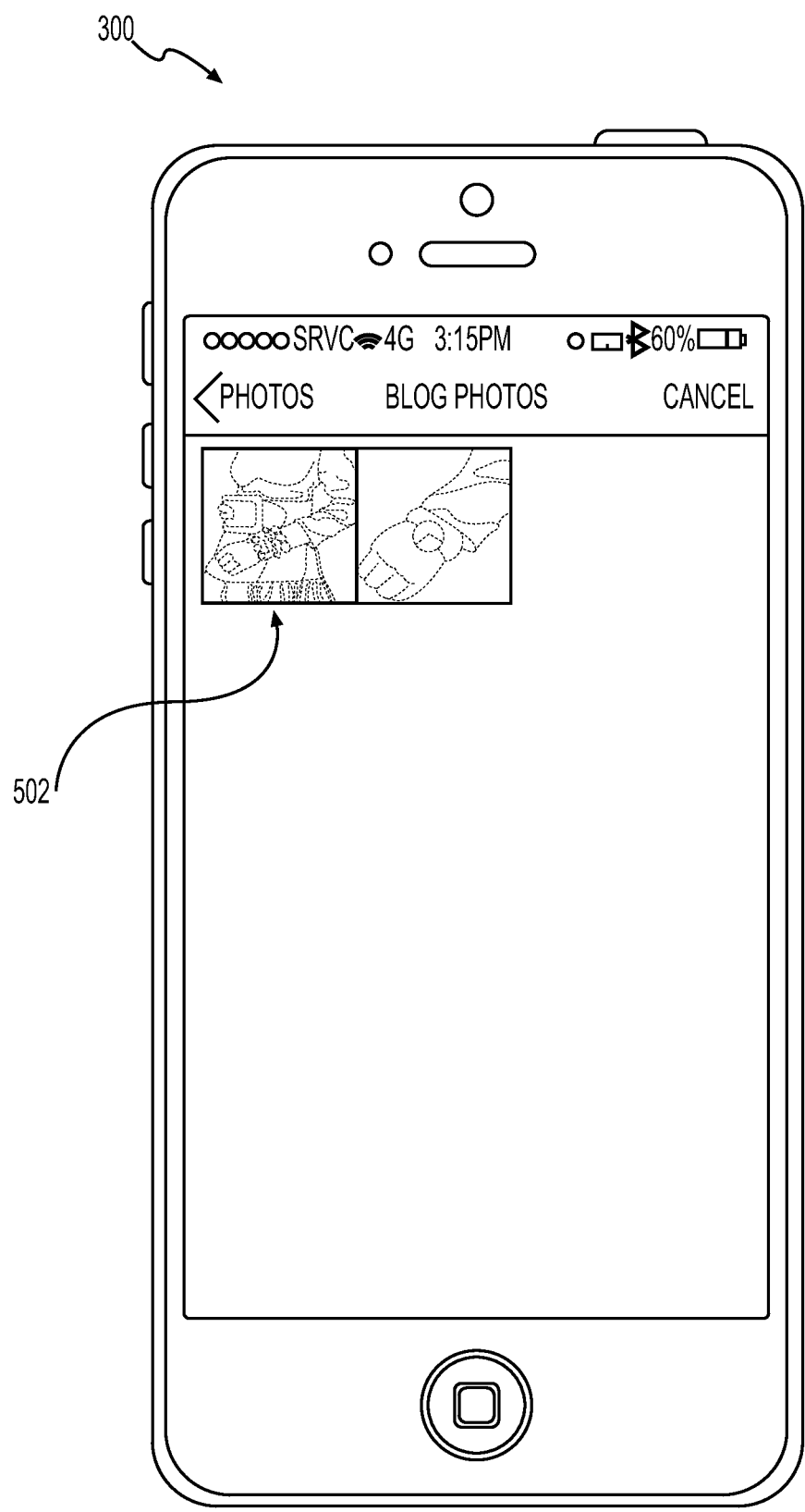
FIG. 5 depicts a screen of a publisher user handheld computing device depicting a media selection screen, according to one or more embodiments.

In accessing the system functionality, the publisher user must first select a digital media file for posting on the social media network service. FIG. 4 is a depiction of the screen of a publisher user handheld computing device (300) depicting the media folder screen as provided by the embodiment. The publisher user is presented with folders from which to select the digital media file for posting (402). Upon selection of a folder, the digital media files are made available. FIG. 5 is a depiction of the screen of a publisher user handheld computing device depicting the media selection screen as provided by the embodiment. The publisher user selects a digital media file for use (502). Once selected, the publisher user is presented with his or her favorites folders as maintained by the system.

Figure 6:
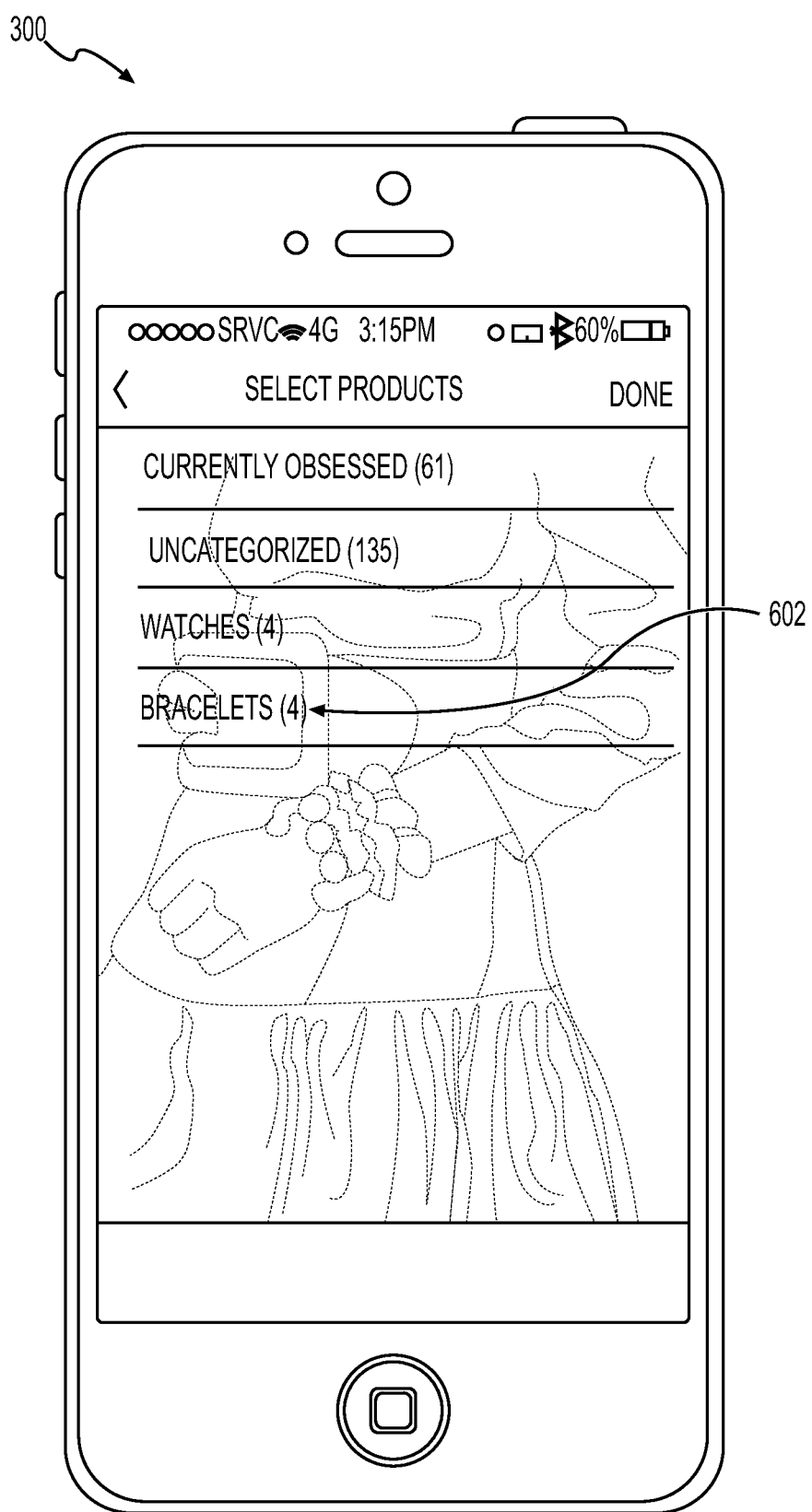
FIG. 6 depicts a screen of a publisher user handheld computing device depicting a favorites folders, according to one or more embodiments.

FIG. 6 is a depiction of the screen of a publisher user handheld computing device depicting the favorites folders as provided by the embodiment. As stated above, the favorites folders in this embodiment contain favored consumer product image data/metadata and links to sources of various consumer items of interest to the publisher user. The publisher user selects a favorites folder (602) containing consumer items visible in the selected digital media file, and is presented with a display of the favored consumer products stored therein as depicted in FIG. 7.

Figure 7:
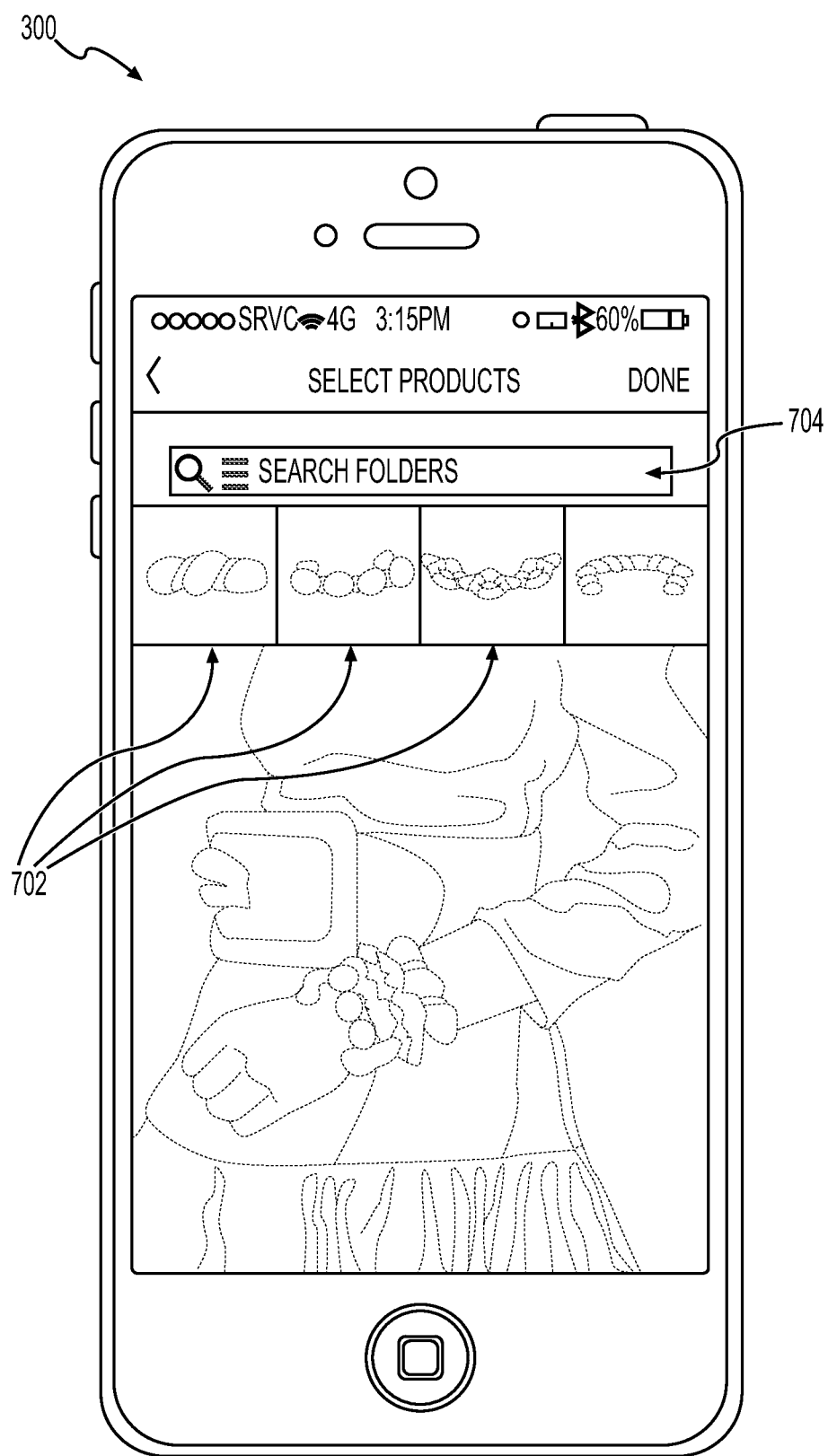
FIG. 7 depicts a screen of a publisher user handheld computing device depicting product links available in a particular favorites folder, according to one or more embodiments.
Figure 8:
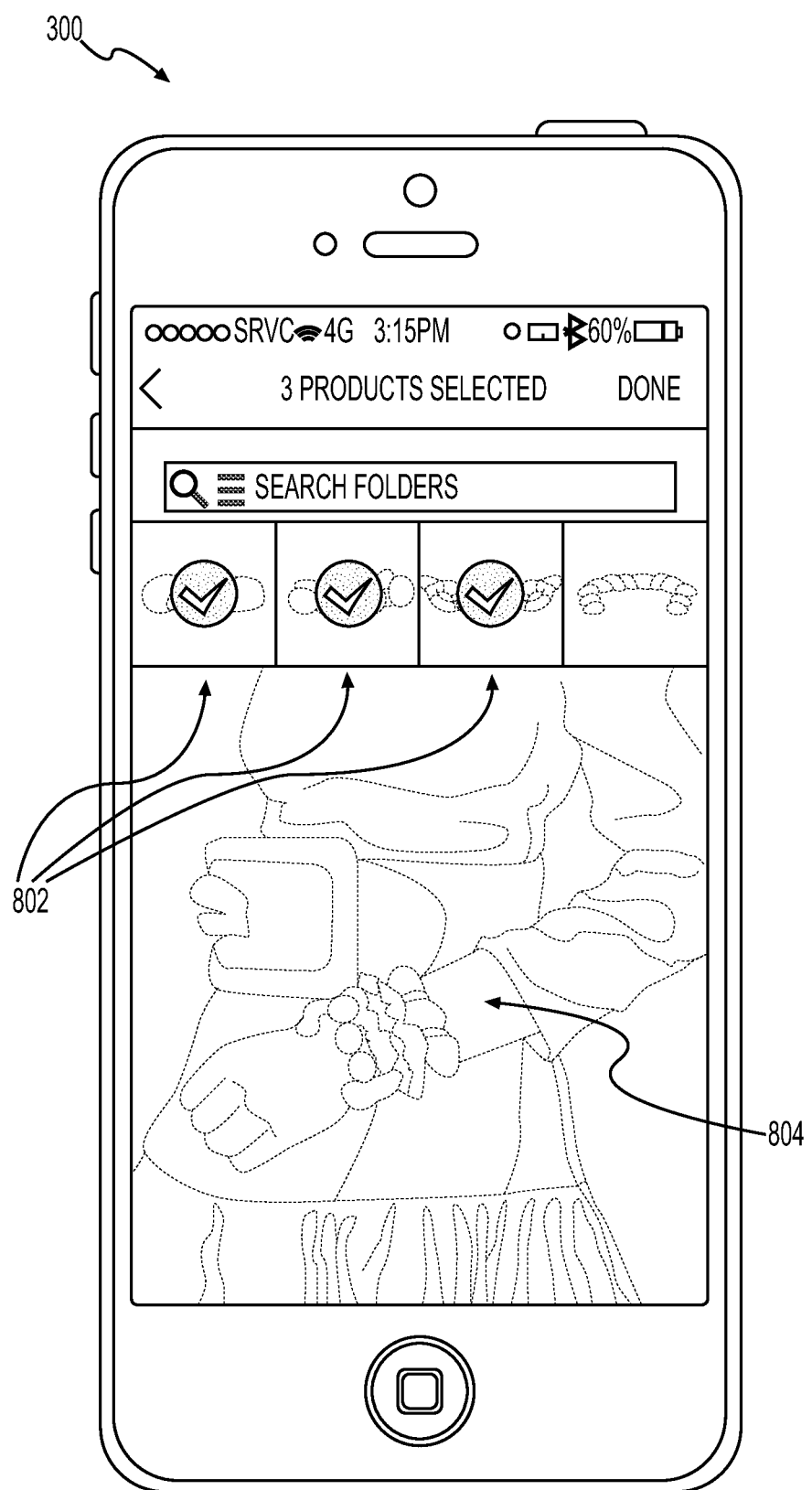
FIG. 8 depicts a screen of a publisher user handheld computing device depicting selected favorites consumer product links, according to one or more embodiments.

FIG. 7 is a depiction of the screen of a publisher user handheld computing device (300) depicting the product links available in a particular favorites folder as provided by the embodiment. Shown in the figure are favored consumer products retained by the system in the publisher user's selected favorites folder (702). Publisher users also have the ability to search the contents of the folder (704) in the event of a large number of stored items, or of the system database for other such saved consumer product image data/metadata. In addition to searching, browsing, and ranking images and videos, the products links described above enable users to shop (i.e., purchase) products featured in those images and videos, by clicking or otherwise selecting formatted URL links to shopping carts and other e-commerce landing pages. FIG. 8 is a depiction of the screen of a publisher user handheld computing device depicting the selected favorites consumer product links as provided by the embodiment. Depicted are the selected products (802) in the folder that the publisher user wishes to highlight in the chosen digital media file (804). In this case, the digital media is a photographic image of a female's wrist with stacking bracelets (804). The images from the favorites folder that were chosen (802) are the bracelets in the image (804).

Figure 9:
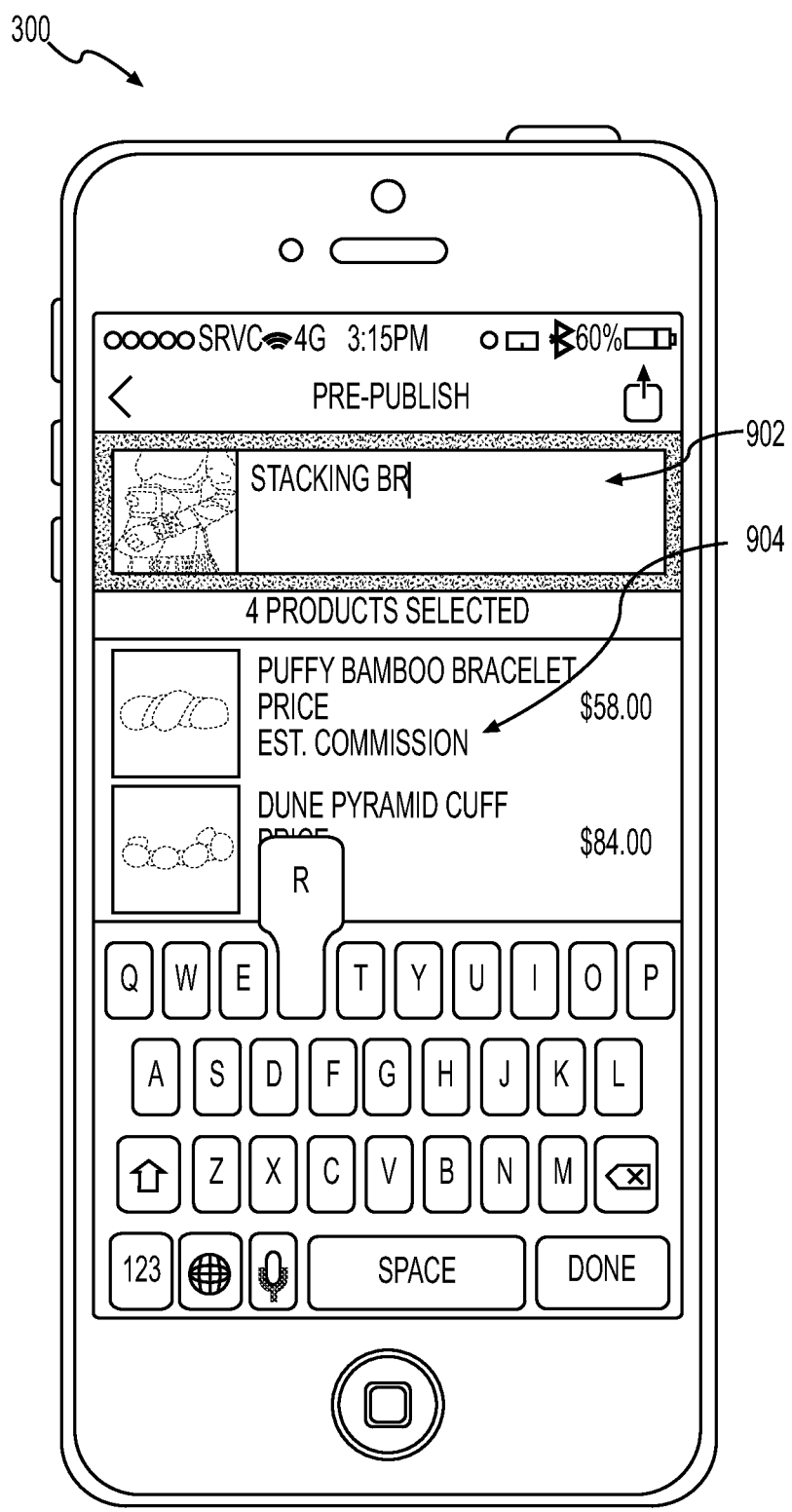
FIG. 9 depicts a screen of a publisher user handheld computing device depicting entry of a caption for selected media and appended unique identifier, according to one or more embodiments.

FIG. 9 is a depiction of the screen of a publisher user handheld computing device (300) depicting the entry of a caption for the selected media and appended unique identifier as provided by the embodiment. After selecting the items from the favorites folder or from the results of a search of the system database, the publisher user is presented with a screen for entry of a caption to accompany the digital media file (902), preferably a description of the image contents. Below the caption entry is a listing of the selected items, including item metadata (for example, purchase price, commission amounts, source for item, etc.).

Figure 10:
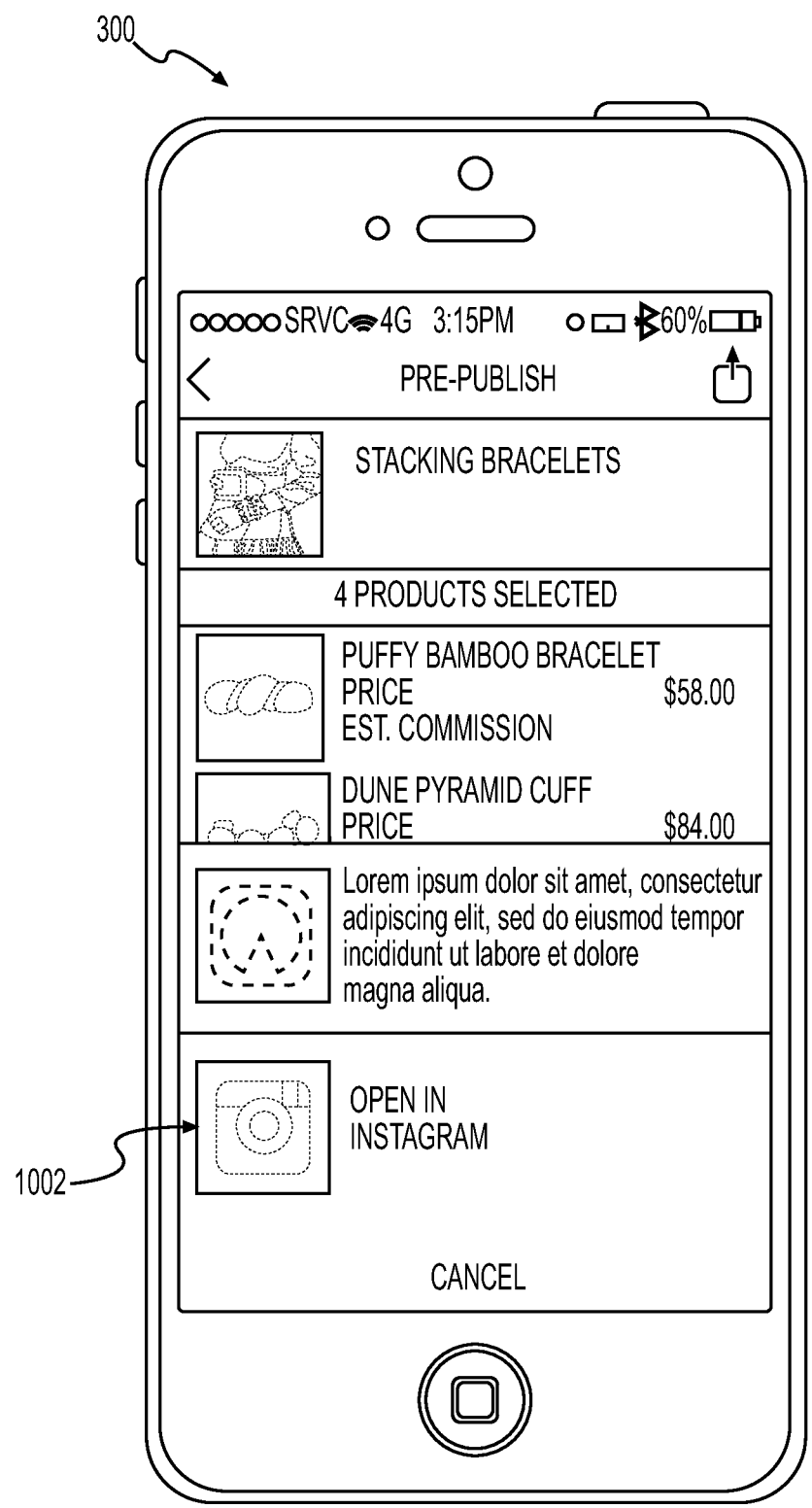
FIG. 10 depicts a screen of a publisher user handheld computing device depicting a social media network publication selection screen, according to one or more embodiments.

Following selection of items and entry of a caption, the publisher user is presented with the pre-publication screen for publication to the social media network service. FIG. 10 is a depiction of the screen of a publisher user handheld computing device (300) depicting the social media network publication selection screen as provided by the embodiment. In this instance, the digital media and data are intended for publication on the Instagram social media network service, which may be accomplished by selecting the Instagram icon (1002). It is also possible for the publisher user to copy the information unique identifier that is presented to a web browser clipboard or text editor, and paste the copied information unique identifier as a caption or comment manually in a social media posting.

Figure 11:
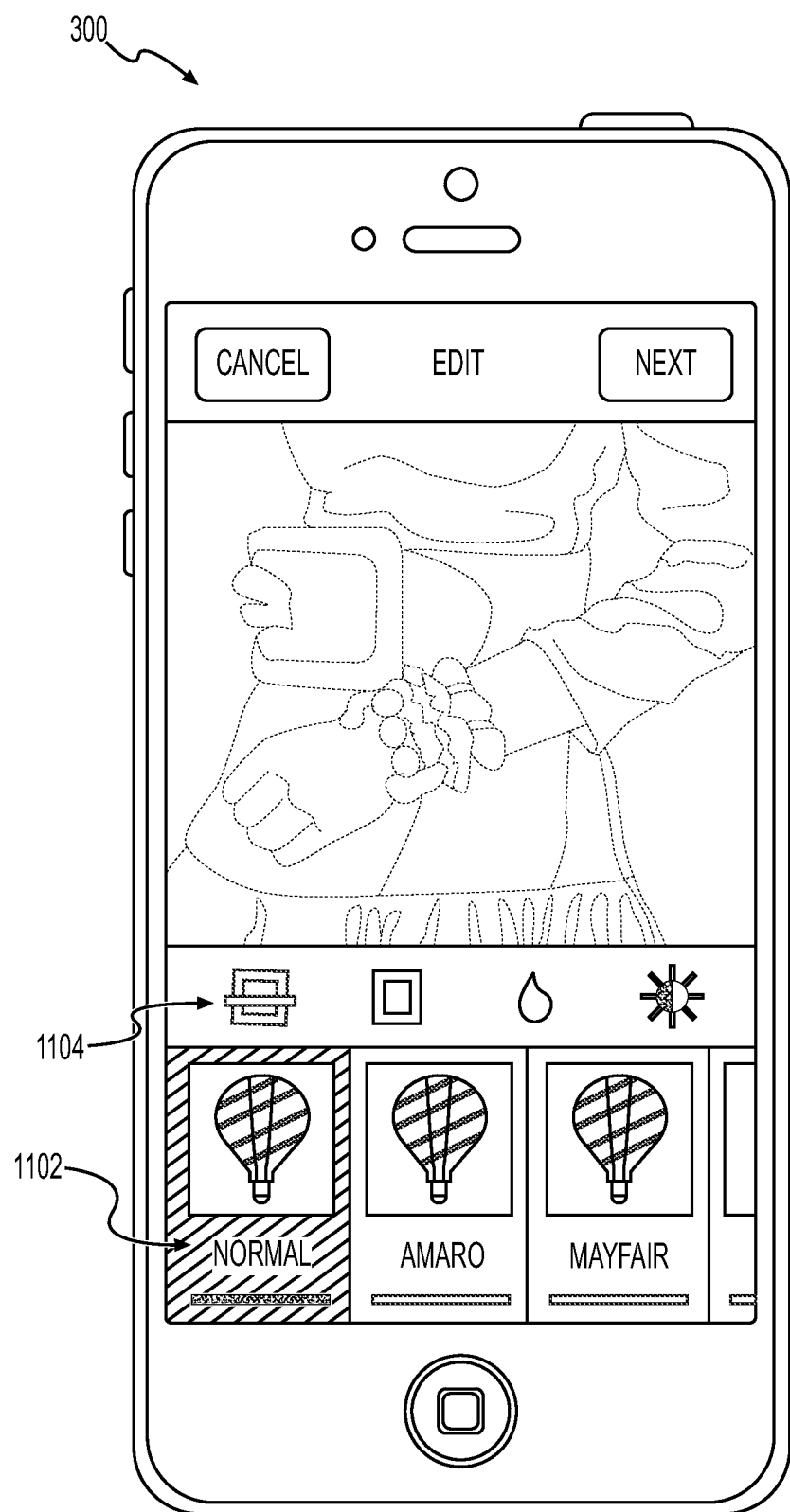
FIG. 11 depicts a screen of a publisher user handheld computing device depicting a social media network media editing screen and options, according to one or more embodiments.

Upon selection of the Instagram social media network service icon (1002), the publisher user interface changes to the social media network service image modification screen. FIG. 11 is a depiction of the screen of a publisher user handheld computing device (300) depicting the social media network media editing screen and options as provided by the embodiment. As shown, the publisher user is provided with numerous filters (1102) that may be applied to the digital media image, including rotation, brightness, and contrast adjustments (1104). Once the digital media image is adjusted, if desired, the image is ready for posting on the social media network website.

Figure 12:
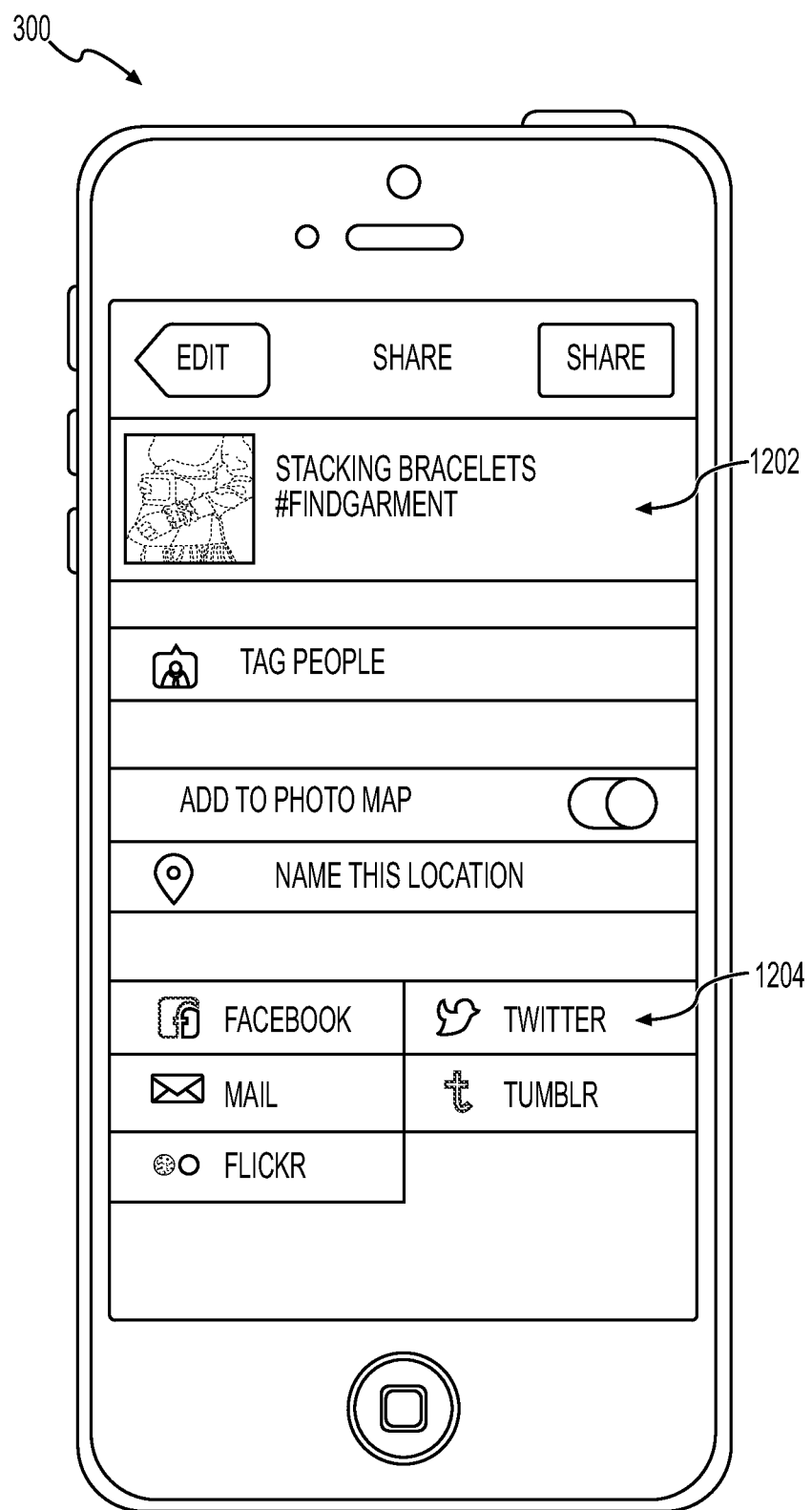
FIG. 12 depicts a screen of a publisher user handheld computing device depicting a social media network media sharing screen, according to one or more embodiments.
Figure 13:
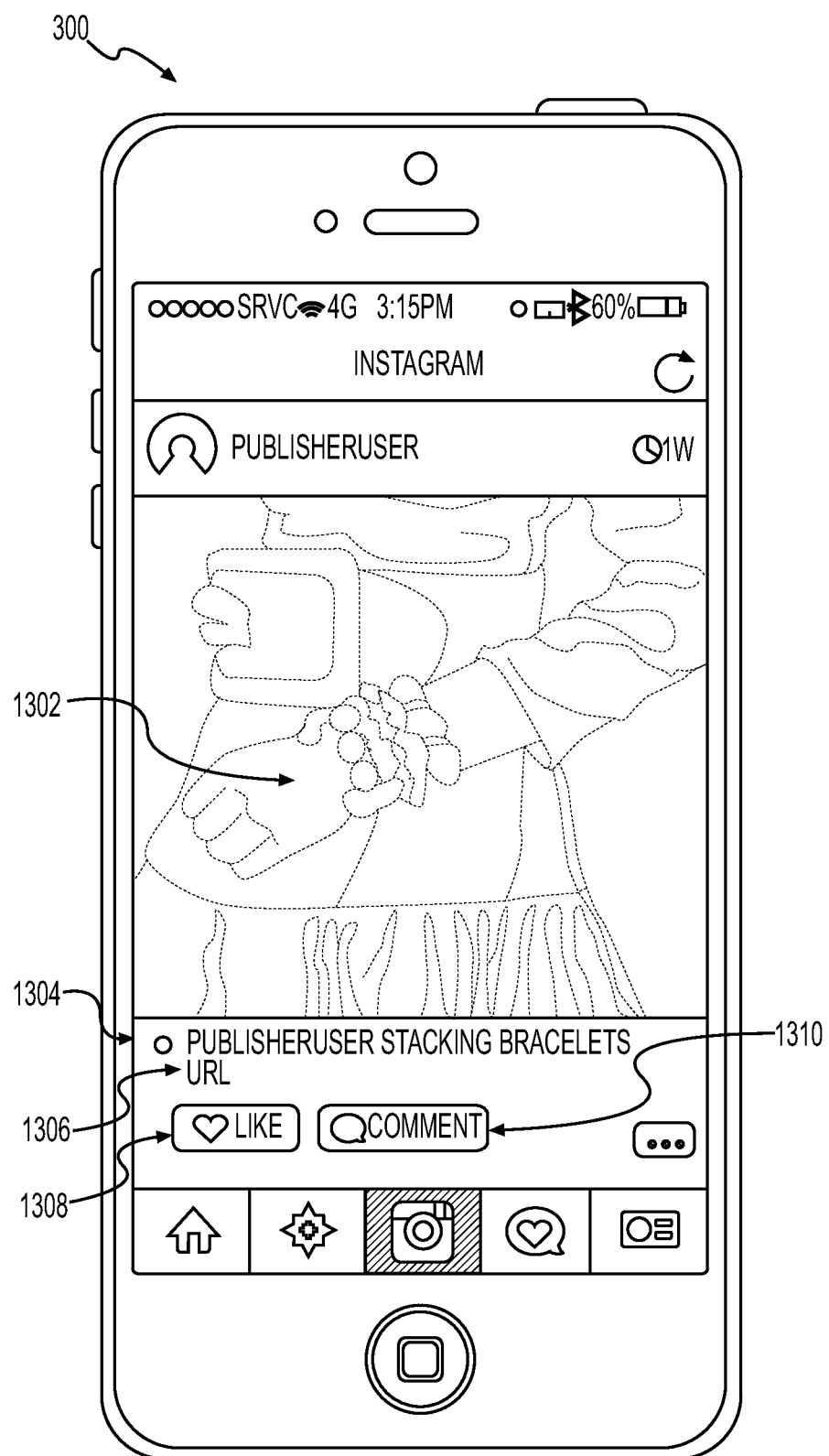
FIG. 13 depicts a screen of a publisher user handheld computing device depicting a social media network publisher shared media, according to one or more embodiments.

FIG. 12 is a depiction of the screen of a publisher user handheld computing device depicting the social media network media sharing screen as provided by the embodiment. This screen presents the publisher user with the ability to edit the digital media file metadata (1202) and to post the posted image on a selection of other social media network services (1204). Once formally published, the publisher user is presented with the posted digital media file as it appears on the social media network service website as in FIG. 13. FIG. 13 is a depiction of the screen of a publisher user handheld computing device depicting the social media network publisher shared media as provided by the embodiment. Visible on this screen is the posted digital media file (1302), the caption (1304) containing the information unique identifier elements (1306), and the ranking feature (1308). The digital media file is now formally posted on the social median network service website and the system is notified and the information unique identifier is activated by the system.

Figure 14:
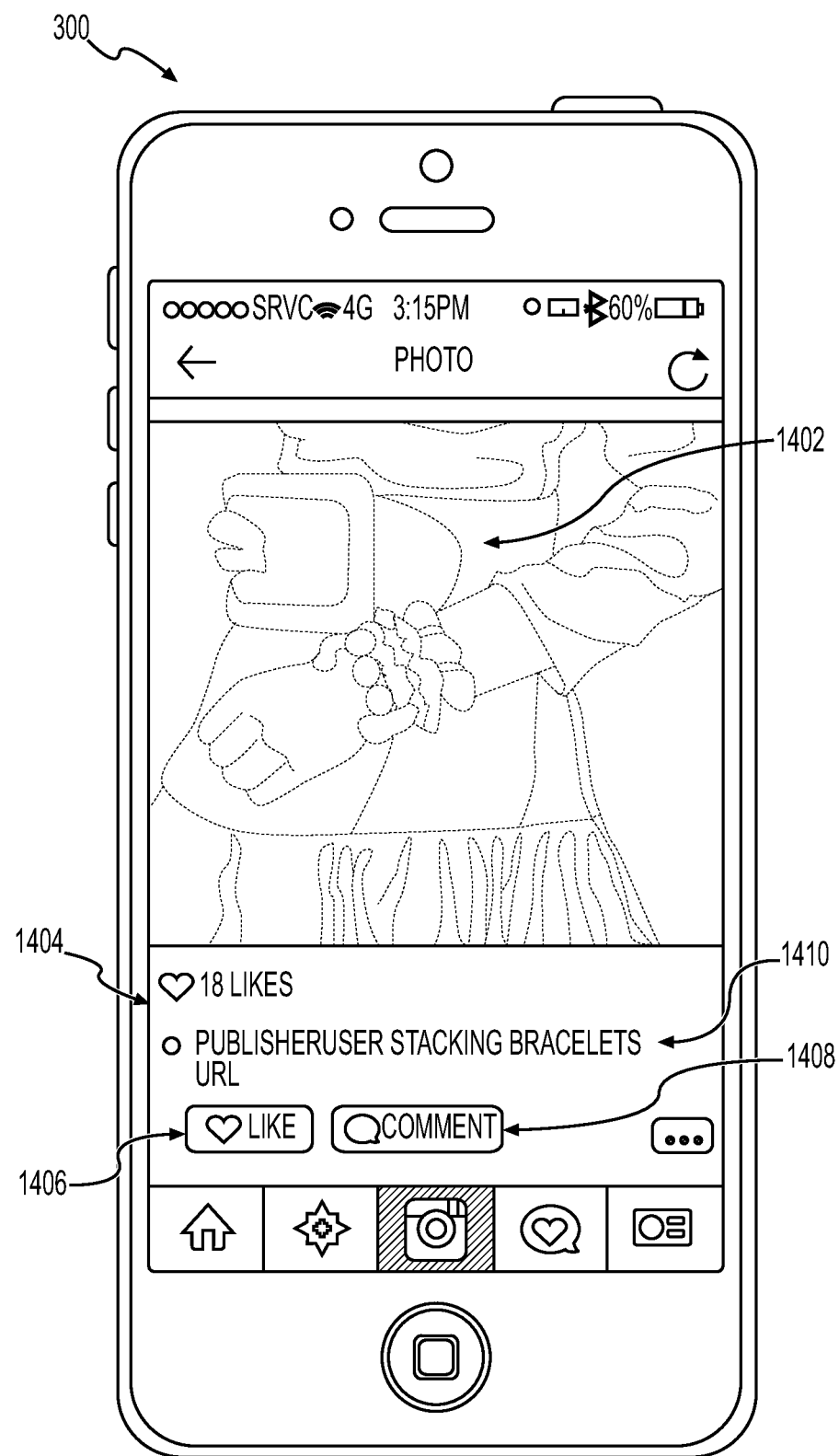
FIG. 14 depicts a screen of a social media member user handheld computing device depicting a social media network screen for member user review, ranking, and purchase, according to one or more embodiments.

FIG. 14 is a depiction of the screen of a social media member user handheld computing device (1400) depicting the social media network screen for member user review, ranking (e.g., "liking," "hearting," or "favoriting," and purchase (i.e. for the products to be "shopped") as provided by the embodiment. In this example, the digital media file image (1402) is presented as posted, with the caption containing the information bundle presented below (1404). The member user is given the option to rank the image by selecting the "like" button (1406), and/or may add a comment (1408) to the post. In another embodiment the posted comment is retrieved by the system in the same fashion as the ranking, and is utilized alone or in conjunction with the ranking to further refine the targeting of marketing information to the member user. Finally, and most desirably, the user may be enabled to select a formatted URL link, icon, button, or other user element to shop products featured in the media. In one embodiment, the shopping URL link, icon, button, or other user element may be embedded within the media (e.g., within a photo or video). In another embodiment, the shopping URL link, icon, button, or other user element may be positioned below or adjacent to the media. The shopping URL, link, icon, button, or other user element may call a pop-up, a preview of a product, a shopping cart, or any other e-commerce interface enabling the user to shop products featured in the media.

Ingesting and Presenting a Video with Associated Linked Products and Metadata as a Unified Actionable Shopping Experience A content author, often referred to as an influencer or creator, may make use of the systems and user applications described above to provide content to other users, sometimes referred to as "followers" of the influencer or creator. This content can be, but is not limited to, video content, products in the form links and image assets, as well as other metadata such as descriptions, hash-tags, titles, author handles, etc. An instance of this content, in aggregate form, is generally referred to as a post.

User applications, such as those described above, may provide a user experience allowing the creator to select a video from local storage, associate a number of products with the video, and add supporting metadata such as, for example, a post description. These assets taken together constitute an enriched or enhanced post that is more engaging and shoppable.

Selecting a video from local storage may include, but is not limited to, selecting that video from an existing camera roll platform feature or widget. When a video is selected for inclusion into a post, a process may be presented by which trimming and other edits can be performed to the video. These edits can be performed in both a destructive or non-destructive manner, either preserving or overlaying the original video content on the local device.

The selection of products may be a result of pre-existing product links being created in a separate product link generation process. These product links can be both created and favorited by the creator in separate processes. Favorited products are made available to the creator during this post creation process and may then be further associated with the current post. The linked products may be presented in various forms other than those marked as favorites or provided generally as a favorite. Any number of products may be included in a post or a limit may be imposed in either client or server side logic.

When a creator is satisfied with the constructed post, the creator may then submit that post to be shared with a consumer audience. During this process, the video and other associated assets related to the post may be sent to a server process. This server process may process the post materials for display to end users.

In the case of video, the video file may be uploaded from the client device and may be further directed by associated server processes to be routed through a transcoding process. This transcoding process is multi-faceted in that there may be several outcomes associated with the overall process. Primarily, the transcoding process is meant to convert the incoming video file into one or more files, all of which are consumable by various mobile platform devices, including, for example, iOS and Android, etc. This may ensure that video produced on one device will be compatible with the playback capabilities of another device. Additionally, the transcoding operation may result in creation of several files, each with their own resolution and bitrate. This may allow for the delivery of video content to a mobile device encoded at a bitrate which is compatible with the current bandwidth of the device, taking network conditions into consideration, and may allow for a quality, buffer-minimizing user experience. In addition, an associated playlist file may also be created such as in the format of an m3u8 playlist. The files resulting from the transcode step may be contained within this playlist. By presenting this playlist file to the consumer facing application for playback, such as by a URL, the device platform, generally iOS or Android, may select the most representative file URL within the playlist to be sent to the client device and streamed or downloaded, again possibly taking into consideration network conditions. The processing of the other associated post assets may be handled as appropriate to the type of post asset.

When the processing of the post materials is complete, a message may be sent to the creator, such as by way of the creator's mobile device, indicating that the post is available for viewing by a consumer. In addition, the post may be categorized by the creator to be published on a date and time, of their choosing, in the future. When a consumer experiences a post, they may experience it as part of a feed of posts, delivered in either a continuously scrollable or paginated fashion. This feed information may be delivered to a consumer device via an application programming interface (API). This API may be processed by the consumer facing application. Upon the completion of the API on the consumer device, information relating to a collection of posts may be delivered in a machine or human readable format such as Java script object notation (JSON), or other suitable format. This consumer experience may comprise, for example, a video, associated products, in the form of images with associated links and other associated metadata. The product images may be set to be clickable and may allow for the processing and routing of a clicked product to take a consumer through the retailer or brand's variant selection process, in terms of selecting size or color variants, and ultimately completing the buying process for a product. Additionally the transcoding and processing steps outlined above may be subject to other more advanced features including object/product recognition, branded logo insertion, etc.

Figure 19:
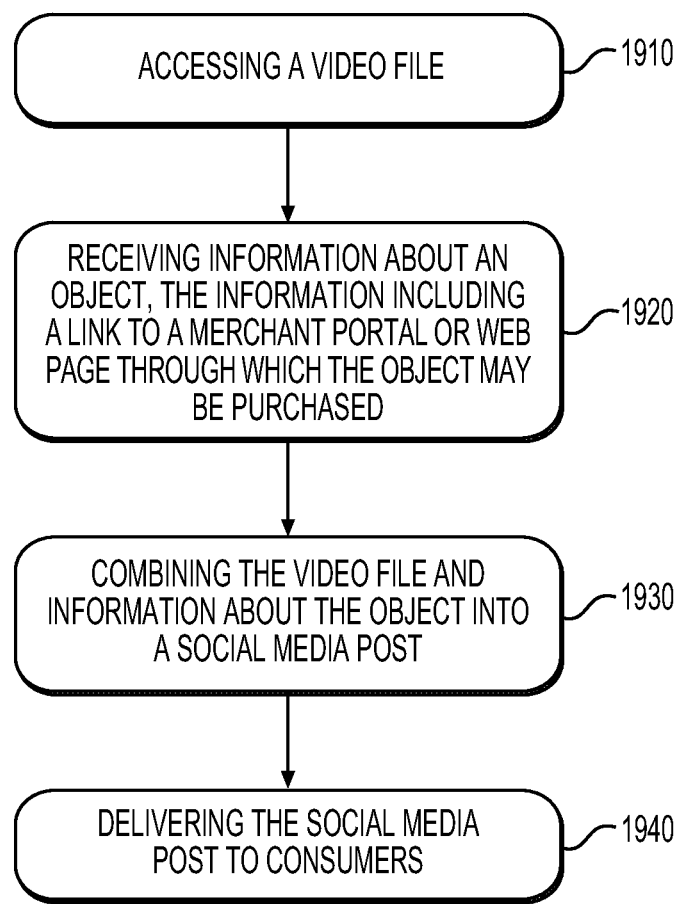
FIG. 19 depicts a flowchart of a method of ingesting and presenting a video with associated linked products and metadata as a unified actionable shopping experience, according to one or more embodiments.

These features may be provided in a method for ingesting and presenting a video with associated linked products and metadata as a unified actionable shopping experience, such as is shown in FIG. 19. As shown in FIG. 19, at operation 1910, the method may access a video file. At operation 1920, the method may receive information about an object, the information including a link to a merchant portal or web page through which the object may be purchased. At operation 1930, the method may combine the video file and information about the object into a social media post. At operation 1940, the method may deliver the social media post to consumers.

Enabling Sharing of Videos and Streaming Media

The platform discussed above may provide for sharing video-type content, as well as additional features relating to sharing of videos of products, whether pre-recorded, live video, streaming or otherwise. For example, the platform may be used to provide an interface for uploading videos of products consistent with the present disclosure. These features may enable users of the platform (e.g., "influencers") to produce, monetize and share short (e.g., up to two minute, five minute, etc.) videos in the shopping app (e.g., reward- Style's LIKEtoKNOW.it app), including beauty how-tos, home tours, expanded outfit-sharing and product reviews. Thus, all of the features described herein may be combined with techniques for enabling users of the application to shop (e.g., browse and/or purchase) products featured in the media, whether photographic, recorded video, or live/streaming video. Shopping video performance data and analytics may also be available immediately in an associated influencer marketing management dashboard, where brands can manage proprietary performance information like insights into Revenue Producing Influencers (RPI), channel performance, app statistics and campaigns reporting.

Additional interfaces may be provided to select and add media, trim the media, and add captions and products to the uploaded media (e.g., recorded or live streaming video).

Other interfaces may be provided to select a thumbnail image, and add hashtags or other labels to the video content. The posted media, whether photographic, recorded video, or live/streaming video may then be shopped within the mobile application in which it appeared. As described above, the products may be shopped based on a user interacting with the media itself, user icons in or around the media, or other links or icons within the mobile application that call one or more desired e-commerce interfaces.

As described above, one or more embodiments may include additional features that are layered onto an influencer or photo/video-sharing platform (e.g., mobile app). In other words, the above-described systems, interfaces, etc. may all be used in combination with any of the following described features.

Creating Custom Branding Logos in Shareable Content

Influencers often wish to have their own custom logo on their videos. The also wish to have the ability to change their logos as they see fit over time.

When a user chooses to change their visual branding, the process may begin by creating a large asset for the largest display that may be supported for the given media type. This may be filtered down to a generic iterating task to iterates through a complete list of media to be rebranded. One or more embodiments may use scalable vector graphics (SVGs), to support them changing a username (should the user so choose to have their username in their brand image). By ensuring the SVG using a high fidelity typeset, one or more embodiments may ensure that a generated asset may scale to lower dimensions for display on lower size videos.

However, most implementations of media transcoders do not properly scale images such that they preserve fidelity and smooth curves; rather they create choppy artifacts. Accordingly, one or more embodiments may pre-scale images before handing the images off to a transcode task that adds the overlay to the media. This transcode process may use the original uploaded source media.

A data store may also be utilized to track when a given client has a rebrand activity in progress and to keep track of important attributes like task start time, input configuration(s), and task completion time.

One or more embodiments may ensure that assets are not recreated for a given media's dimensions through use of a cache system such that the only context the task iterator needs to track are the sets of input media and the brand overlay definition. This may allow the process function at scale.

Deriving Multi-Lingual Search Engine Optimization from Video

An influencer-based marketing platform according to one or more embodiments may have the ability to host both video and still images. These videos and images are generally referred to as "hero" shots, and may be accompanied by caption text, hashtags and associated product links that relate to the video or still images. In the specific case of video, video is often accompanied by an audio track which also includes spoken language. During a complex transcoding function which takes a video file as an input stream and outputs a different type of file, optimized for streaming or mobile consumption, the audio track may be isolated and routed to a further transcoding operation. This transcoding operation may route the audio track through a speech recognition process which may create a time stamped text file in an XML or other format. This file may then be further processed by a text translation process running in multiple different language contexts. The output of this process may be a number of files in XML or other formats. These output files may then be input to search engine optimization components and may also be used within a conversational computing environment which may increase the efficiency of finding materials relating to a specific source video. Such a process may also relate to still images as these images may include caption text and other file specific tagging artifacts.

Ensuring Branded Overlay Clarity on Low Resolution Video

A user providing a relatively low pixel count or low bitrate video may desire a branded video that clearly shows their brand, regardless of the input stream quality.

For a given video with a given number of pixels, there may exist some ratio of video bitrate per pixel per pixel depth that provides an aesthetically pleasing display of a brand logo where artifacts gained in the logo during a transcode process are minimized. If a video were to transcoded below this bitrate per pixel per pixel depth threshold the brand image may be at risk of turning fuzzy or gaining artifacts not appealing to the end user. One or more embodiments may include experimentation for arbitrary video output codecs such that an optimal value may be derived for that codec and ensuring each video going through a branding process according to one or more embodiments uses a bitrate per pixel per pixel depth that meets or exceeds this value.

Such an approach may be customized per brand partner if their branding is more dynamic than a single image. This may be achieved implicitly by optimizing for known output formats if using static media such as images. In addition a trained image recognition algorithm may be used on high entropy frame transitions to ensure the brand image may be recognized if it is a static picture.

Publishing A Streamable Media With Increasing Bandwidth Modalities

When a client uploads a video media file with the intent to share and publish to a following audience, the client often wants to minimize the time to first stream such that they can minimize their time spent waiting on backend services.

A traditional way of transcoding can be to read a source stream once and create N output streams for the various streaming bitrates and purposes that are desired. This approach is often an 10 bound operation, meaning the more outputs created in a single transcode operation, the longer the operation takes to complete. To minimize wait time, one or more embodiments may declare a system of identities and references such that a general streaming media source, such as an HTTP Live Streaming (HLS) stream identity, gains additional maximum bitrates over time.

According to one or more embodiments, a given media stream may be a guide that maps to an HLS .m3u8 file via a record in a datastore. On display of a context wrapping an identifier of a media, the current location of a processed m3u8 file in a content delivery network (CDN) may be returned. If the input file is already in a format optimized for HLS streaming, an HLS stream .m3u8 file may be retroactively created for the uploaded video file and both the original video file and stream definition to a CDN origin may be published. If transcoding of the uploaded video file operation is needed, a subset of video bitrates may be chosen such that low bandwidth and average bandwidth clients may receive an optimized experience and the associated HLS .m3u8 files may be published to a CDN origin along with their underlying video chunk files. This may reduce the time the client is waiting for the media stream to be available for publication.

After these operations, an asynchronous job may be constructed to transcode the remaining stream bitrates and merge these chunks into a new HLS stream, such as by referencing the already existing streams where possible. All the original stream files may be left as they were and may not be deleted until a later time through another asynchronous job, possibly with special consideration to push redirect rules to the CDN for any previous .m3u8 file that was removed.

All HLS streams and CDN locations may be stored under a transcode job guide directory path so that a service in front of the data store may remap a media stream ID to a stream that supports more bandwidth modalities as they become available.

Special consideration may be taken to not run multiple transcodes that would merge stream files at the same time. Further, as stream locations are updated, clients may be informed of the additional modalities available should the client have a less than optimal viewing experience for their available bandwidth.

Processing Asynchronous Callbacks Regardless of Client Application State

One or more embodiments relate to the coordination of messaging between a client and the associated backend services it relies on. This event-based system may coordinate, prioritize, and associate background processes and may queue with specific notifications exposed on the client side. In general, server-side processes may complete tasks in an asynchronous manner, the methods according to one or more embodiments may create an orchestration component which may use sophisticated logic to rationalize state data. This state data may then be processed for display in a human facing application and may deliver the flow of state information that the human needs in order to work efficiently within an application context.

Providing In-Store Navigation to Favorited Products

Through a mobile app, according to one or more embodiments, influencers may post still images and videos complemented by caption text, hashtags and products. These products may be bought online through the app or may also be purchased at a physical store location. One or more embodiments may provide product data in combination with integrations into retailer product inventory databases. Further one or more embodiments may interface with indoor retailer beacon-based geolocation systems to direct individuals who have favorited a product, shown interest in a product, or who's profile matches specific products to in-store inventory and geolocation. One or more embodiments may extend to wearable smart watches and operate either dependent or independent of connections between phone platforms and wearable devices.

Video Layout Determination in Dependence on Adjacent Visual Assets

One or more embodiments may create specific asset positioning, cropping and sizing relating to images, videos, widgets or containers. One or more embodiments may relate to mobile and web computing and rendering environments. One or more embodiments may also provide contextual features which may affect the rendering of one object in dependence on adjacent objects. One or more embodiments may further make use of specific metadata tagging of objects and techniques relating to image recognition and analysis that may take place in either real-time or offline batch related processes.

System and Method for Orchestrating Audio Seamlessly Across Multiple Application Forms One or more embodiments may provide a system wide, application wide, seamless orchestration of audio playback with a complex mobile application. One or more embodiments may be based upon a global feature which may coordinate the playback of audio content within a multi-form application and may ensure that audio playback is aligned to the specific user experience currently in focus. One or more embodiments may also allow for background audio playback, independent of video rendering.

System and Method for Orchestrating Video Seamlessly Across Multiple Application Forms One or more embodiments may provide a system wide, application wide, seamless orchestration of video playback with a complex mobile application. One or more embodiments may be based upon a global feature which may coordinate the playback of video content within a multi-form application and may ensure that audio playback is aligned to the specific user experience currently in focus. One or more embodiments may also allow for background audio playback, independent of video rendering.

Deriving Product Placement in Videos and Optimizing Video Playback for Product Discovery In general, sales-oriented videos contain a number of images contained within the frames of the video. The placement, angle or poses of a product within a video may affect the emotional connection that is made to a viewer of the video. One or more embodiments may identify objects in a video frame from a large library of images of objects and information about those objects. By measuring placement, angle, screen time, lighting and many other factors, one or more embodiments may derive quality coefficients related to how a viewer perceives that object in the video. By correlating the derived coefficients to viewer engagement with the depicted object, such as through sales numbers associated with linked products and objects associated with the video, one or more embodiments may further derive overall performance metrics. These performance metrics may then be used in the analysis of a collection of videos that further datamine metrics. These metrics may then be applied as guidance when promoters of the depicted object, such as social media influencers, link products similar to the depicted objects to their posts. The information derived from the videos and viewer engagement may guide promoters in creating future videos that objects to be promoted.

Figure 15:
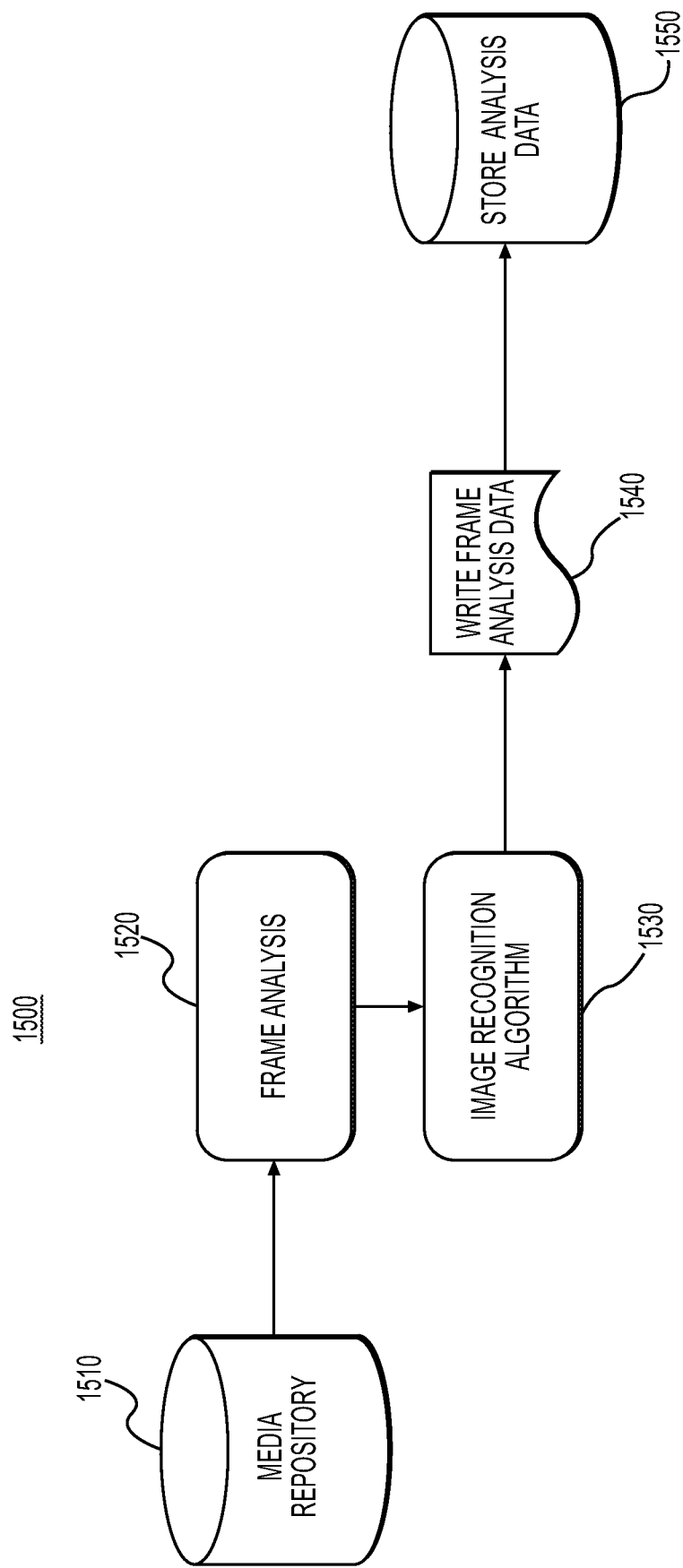
FIG. 15 depicts a portion of a system architecture for ingesting and presenting a video with associated linked products and metadata as a unified actionable shopping experience, according to one or more embodiments.

Thus, promoters, such as social media influencers, increasingly referred to as creators, may benefit from such a system to analyze object placement in videos and provide guidance to enhance the performance of such videos. FIG. 15 depicts a portion of such a system architecture for deriving object placement in video and optimizing video playback for object discovery, according to one or more embodiments.

As shown in FIG. 15, a method for deriving object placement in video and optimizing video playback for object discovery, such as may be implemented by frame analysis module 1520, may initially access a video file from a database, such as media repository 1510. Frame analysis module 1520 may analyze the video file such as to determine a correlation between individual frames of the video file and a set of linked products associated with a publication, such as a social media post. The analysis may make use of image recognition in the video frame, such as by image recognition algorithm 1530. For example, image recognition algorithm 1530 may first isolate individual objects within the video frame, and then may extract the coordinates where each isolated object is placed within the video frame. Image recognition algorithm 1530 may then, at operation 1540, write object coordinate information to a database, such as analysis data store 1550, as, for example, database records, metadata or other recordings. The object coordinate information may include multiple positions within a set of video frames to reflect movement of an object with respect to multiple concurrent video frames. Other information related to the objects in the video frames, such as identification information about the objects, may also be recorded in analysis data store 1550. Through a comparison of object information derived at various scales, from multiple videos, such as a varying number of video files or other content, inferences may be derived and recorded. For example, in addition to using artificial intelligence methods and other image recognition techniques to ascertain which products are associated with a video, further comparisons may be made between unrelated videos to determine if the same, or a subset of products, are contained in each video. These measurements may allow for selective presentation to a consumer of multiple videos, or other content, found to have related products.

Comparing multiple videos, possibly on the scale of thousands or millions of videos, may yield results, and therefore, insights supporting decisions regarding the products within these videos, who (in terms of what influencer or creator) posted the video, how well these videos performed in promoting certain products, the return on advertising spend (ROAS) produced as a result of the video, and the likelihood of a certain influencer or influencers being well suited to participating in paid campaigns for a brand or retailer. Additionally, comparisons may be multifaceted across several different metrics. These metrics may include, for example, when in the playback of a video does the user interact with the post (e.g., like the post, share the post, inspect the author, follow the author, inspect product details, add a product to a wishlist, favorite a product, browse product variations, search product retailers, enable audio, disable audio, pause playback, resume playback, seek a specific playback point of a video) or passively interact with the post (e.g., how many times the user watched the video, the time spent viewing the post before leaving this post's context) along with user attributes (audio state enabled/disabled, device platform, device form factor, device OS version, user's locality/time zone, user's gender, user's demographic or other data). Further, given the metrics captured combined with the test variations applied, together with a set of interaction-based goals set by the creator, brand or retailer, campaign manager, or others, a test strategy may be determined yielding desired results and by what margins those results are compared to other strategies. In addition, this captured data may be used to recommend other strategies for video content generation which may or may not have been considered previously, and which may yield significant gains in user engagement.

The derived inferences may result in guidance given to a social media author contributing the video, or may be generalized and given as guidance to multiple social media authors. This guidance may be curated and delivered as, for example, emails, push notifications, in-app messaging or other forms of distribution.

The social media author providing the video, or another entity involved in the promotion or marketing of the objects depicted in the video, may want to use the video to bring the object or product to the attention of others who may have interest in the object, such as potential purchasers of the object. An additional process may use the coordinate data derived from the image recognition algorithm and create metadata for the video, possibly in frame-wise fashion, to map a uniform resource locator (URL) or other link to a product, thus potentially allowing a user obtain further information about the object, such as options for purchasing, by interacting with the object within the video display, such as by simply touching, clicking, or selecting the object or product shown in the video. Further decoration to that object may optionally be incorporated into the video or on playback using a related file of events correlated to the video. These decorations may be, for example, bounding boxes, glitter effects, highlighting effects, etc.

Figure 16:
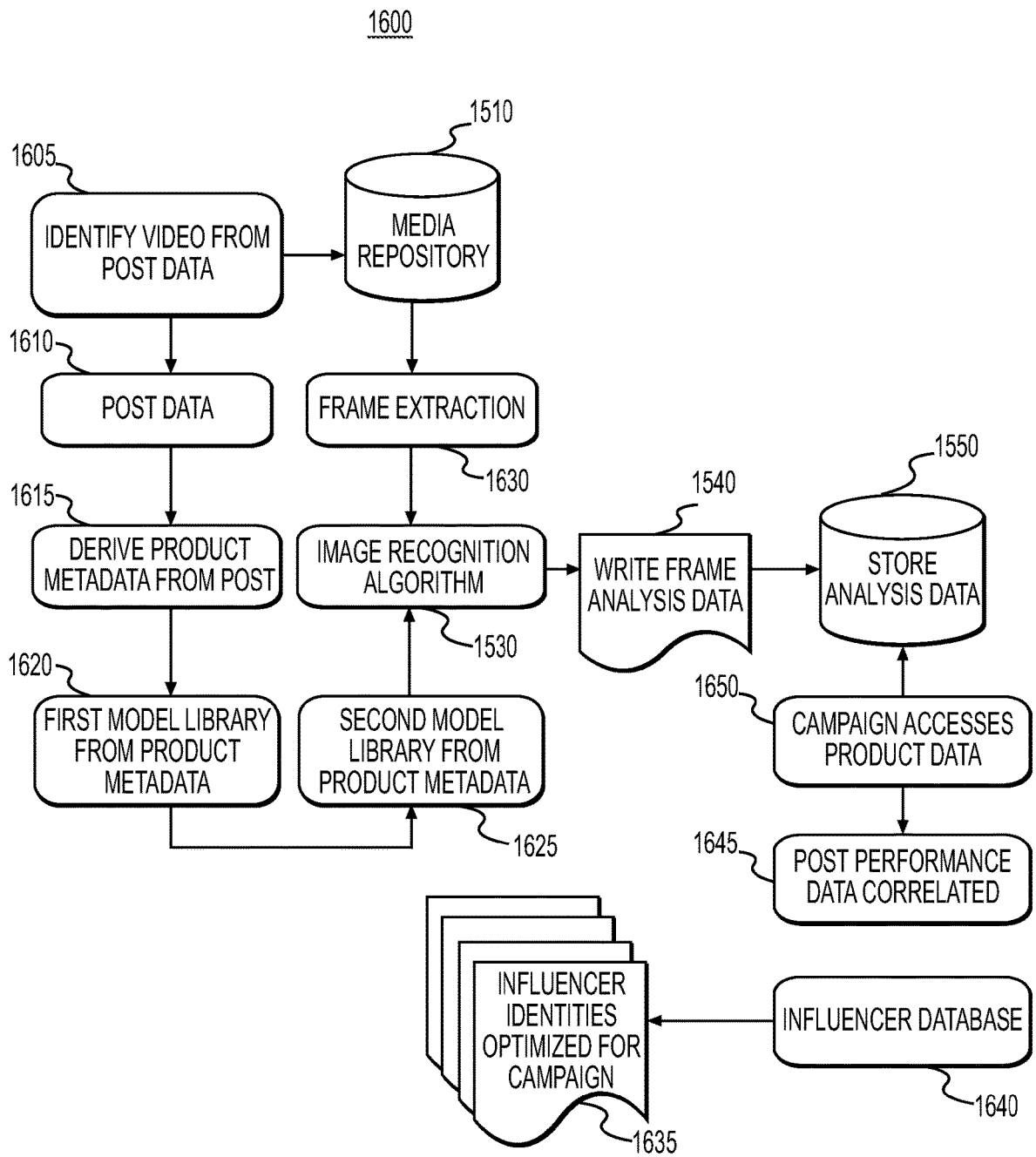
FIG. 16 depicts a portion of a system architecture for deriving objects from a video and mapping them into a content delivery campaign, according to one or more embodiments.

The videos provided by social media authors may be used by those authors and by brands, retailers, or manufacturers to illustrate and promote products. For example, purchases or other interactions with the products linked from object images in the video may generate commissions for the social media author. FIG. 16 depicts a portion of a system architecture for deriving objects from a video and mapping them into a content delivery campaign, according to one or more embodiments. The frame-oriented image recognition method shown in FIG. 16 may be used to identify specific objects or products depicted in the fames of a video. The illustrated process may identify objects from a video or still image source file, recognize that image and use metrics associated with the objects to optimize user interaction with the objects, such as by optimizing a retail campaign. Identified products may then be stored in a database in either structured or unstructured forms. When brands and retailers want to construct a campaign, the process may match the objects, items, or products for the campaign with items found in the source videos and correlated to coupled products. This may match certain existing videos with the objects, items, or products to be featured. The system may then map an object, item, or product to be featured in posts by specific social media authors and may automatically assemble a campaign with reduced human guidance or intervention.

As shown in FIG. 16, a method for deriving objects from a video and mapping them into a content delivery campaign, may initially access a video file from a database, such as media repository 1510. In operation 1605, the method may identify the video based on information and/or metadata in a publication, such as data 1610 of a social media post made by a social media author. In operation 1615, the method may derive certain metadata, such as information about object, items, or products features in the social media post or the video, based on data 1610. In operation 1620-1625, the method may model one or more libraries from the derived metadata. For example, more than one model library may be produced from metadata for the purpose of using an artificial intelligence method, such as a machine learning algorithm, to refine training for the subsequent processing of videos using improved image recognition. In one or more embodiments, the method may present to a machine learning process, one or more product, or object, libraries. These libraries may be used by a machine learning process. When products are used in the context of a post, and these products do not have sufficient metadata to fully relate the product to a product category, model libraries, used with specific machine learning algorithms, allow these associated algorithms to identify the products, associate with a product category, resolve to a particular product variant (e.g. color, size, etc).

In operation 1630, the method may extract one or more individual frames from the video. Image recognition algorithm 1530 may first isolate individual objects within the extracted video frames based on the information from operation 1620, and then may extract the coordinates where each isolated object is placed within the video frame. Image recognition algorithm 1530 may then, at operation 1540, write object coordinate information to a database, such as analysis data store 1550, as, for example, database records, metadata or other recordings. The object coordinate information may include multiple positions within a set of video frames to reflect movement of an object with respect to multiple consecutive video frames. Other information related to the objects in the video frames, such as identification information about the objects, may also be recorded in analysis data store 1550.

In operation 1650, the method may allow the platform application provider or additionally a brand or retailer to access product and product placement data. This may further allow for the additional correlation between an intentional or "paid" campaign, initiated between the platform application provider and the brand, to verify product placement within the post, and further measure the effectiveness of that placement.

In operation 1645, the method may allow for a number of algorithmic processes to gather and analyze the metrics produced and stored in analysis data store 1550.

In operation 1640, the method may provide a method for correlating the performance of posts, generally but not limited to a calculation of return on advertiser spend (ROAS), and further associate these post performance measurements with the posting creator or influencer In operation 1635, the method may use the algorithmically derived conclusions relating to post performance as an input to an intelligent casting process which maximizes the likelihood of a particular influencer having promotional success with a particular product.

Further insights into the presentation of items in a video may be gained through an analysis of the placement of items in multiple videos, social media posts, and the performance of campaigns associated with those items. Such analysis may include determining a positional relationship of items in video frames, storing this position metadata, and determining a geometric relationship between multiple frames. The frames may then be individually processed through additional image recognition processes to categorize each item, such as in terms of product type. This image recognition data may then be compared with campaign performance data for other videos and social media posts to determine how similar or different campaigns have performed based on the positioning of items in a group image or based on the relational position in other images. This analytics information may then be used to build dynamic guidance shared with social media authors to relate how to create better optimized group images or collages. This method may also synthetically create optimized collages for either automatic or human reviewable content. This content may ultimately be used in the context of social media posts, but is not limited to use in that context.

Figure 17:
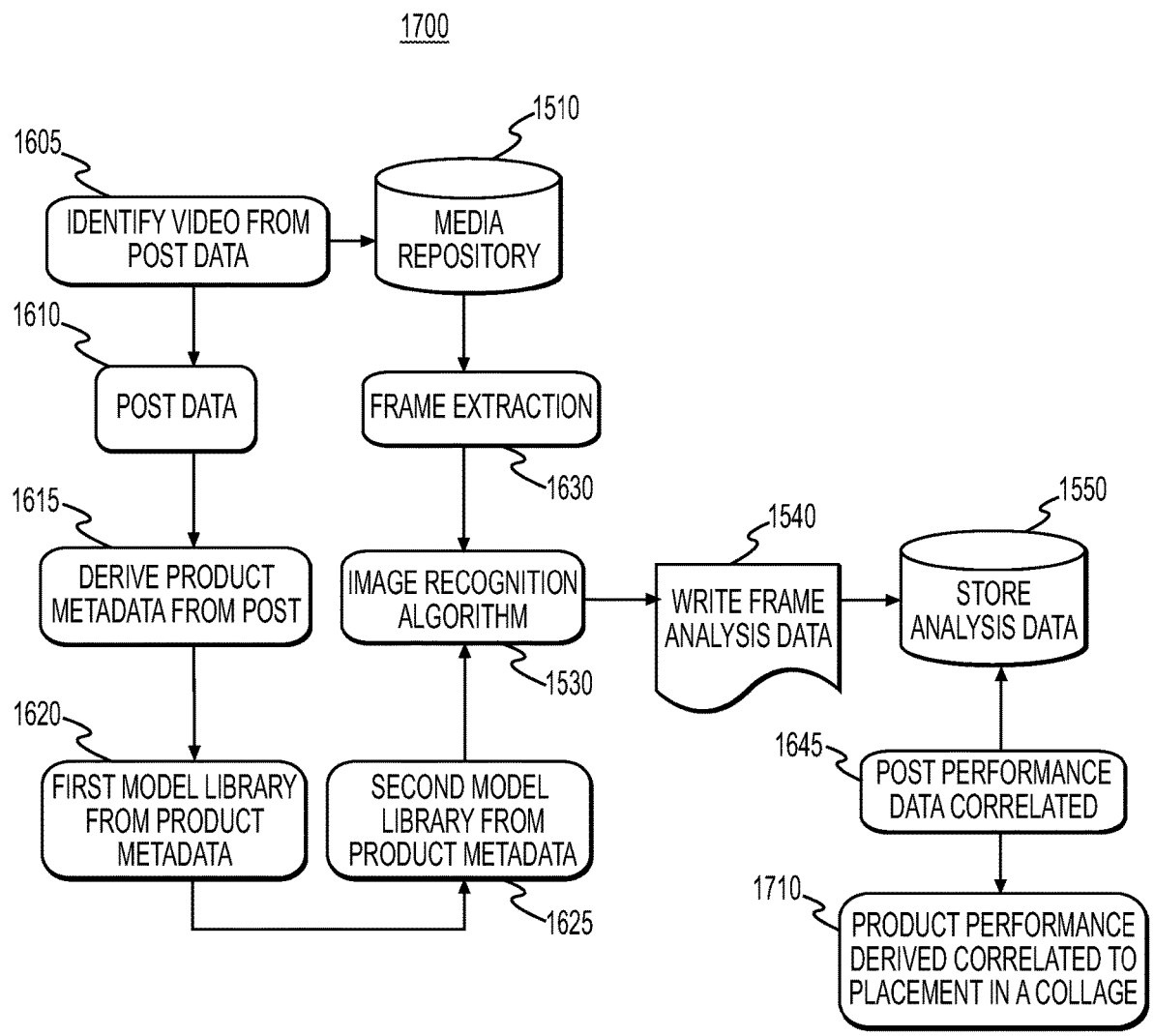
FIG. 17 depicts a portion of a system architecture for identifying relative sub-images within an image and determining the effectiveness of the placement in content delivery performance, according to one or more embodiments.

FIG. 17 depicts a portion of a system architecture for identifying relative sub-images within an image and determining the effectiveness of the placement in content delivery performance, according to one or more embodiments. The illustrated process may identify items, objects, or products from a video or still image source file, recognize individual items or other artifacts within the image and use the metrics associated with the analysis of the positional product placement to determine the performance of an item at the positional level and further use that data to optimize a campaign to feature or promote that item.

As shown in FIG. 17, a method for deriving objects from a video and mapping them into a content delivery campaign, may initially access a video file from a database, such as media repository 1510. In operation 1605, the method may identify the video based on information and/or metadata in a publication, such as data 1610 of a social media post made by a social media author. In operation 1615, the method may derive certain metadata, such as information about object, items, or products features in the social media post or the video, based on data 1610. In operation 1620-1625, the method may model one or more libraries from the derived metadata. For example, more than one model library may be produced from metadata for the purpose of using an artificial intelligence method, such as a machine learning algorithm, to refine training for the subsequent processing of videos using improved image recognition. In one or more embodiments, the method may present to a machine learning process, one or more product, or object, libraries. These libraries may be used by a machine learning process. When products are used in the context of a post, and these products do not have sufficient metadata to fully relate the product to a product category, model libraries, used with specific machine learning algorithms, allow these associated algorithms to identify the products, associate with a product category, resolve to a particular product variant (e.g. color, size, etc).

In operation 1630, the method may extract one or more individual frames from the video. Image recognition algorithm 1530 may first isolate individual objects within the extracted video frames based on the information from operation 1620, and then may extract the coordinates where each isolated object is placed within the video frame. Image recognition algorithm 1530 may then, at operation 1540, write object coordinate information to a database, such as analysis data store 1550, as, for example, database records, metadata or other recordings. The object coordinate information may include multiple positions within a set of video frames to reflect movement of an object with respect to multiple concurrent video frames. Other information related to the objects in the video frames, such as identification information about the objects, may also be recorded in analysis data store 1550.

In operation 1645, the method may allow for a number of algorithmic processes to gather and analyze the metrics produced and stored in analysis data store 1550. Such metrics may include, for example, correlations in post (Hero shots, Products and Metadata) performance such as, but not limited to ROAS, products contained within the post, products contained with the video frames, etc.

In operation 1710, the method may provide a correlation to a video or frame within a video related to a set of coordinates which may further relate to a bounding area within the video or video frame where an object or product has been located. Operation 1710 may further refine the correlations identified by operation 1645, such as by establishing the relationship to a product's placement within a video. Additional measurements may include the length or number of frames in which a product is rendered in a video, the angle of the product in the video, whether other objects are in the same frame or frames of the video, etc.

Figure 18:
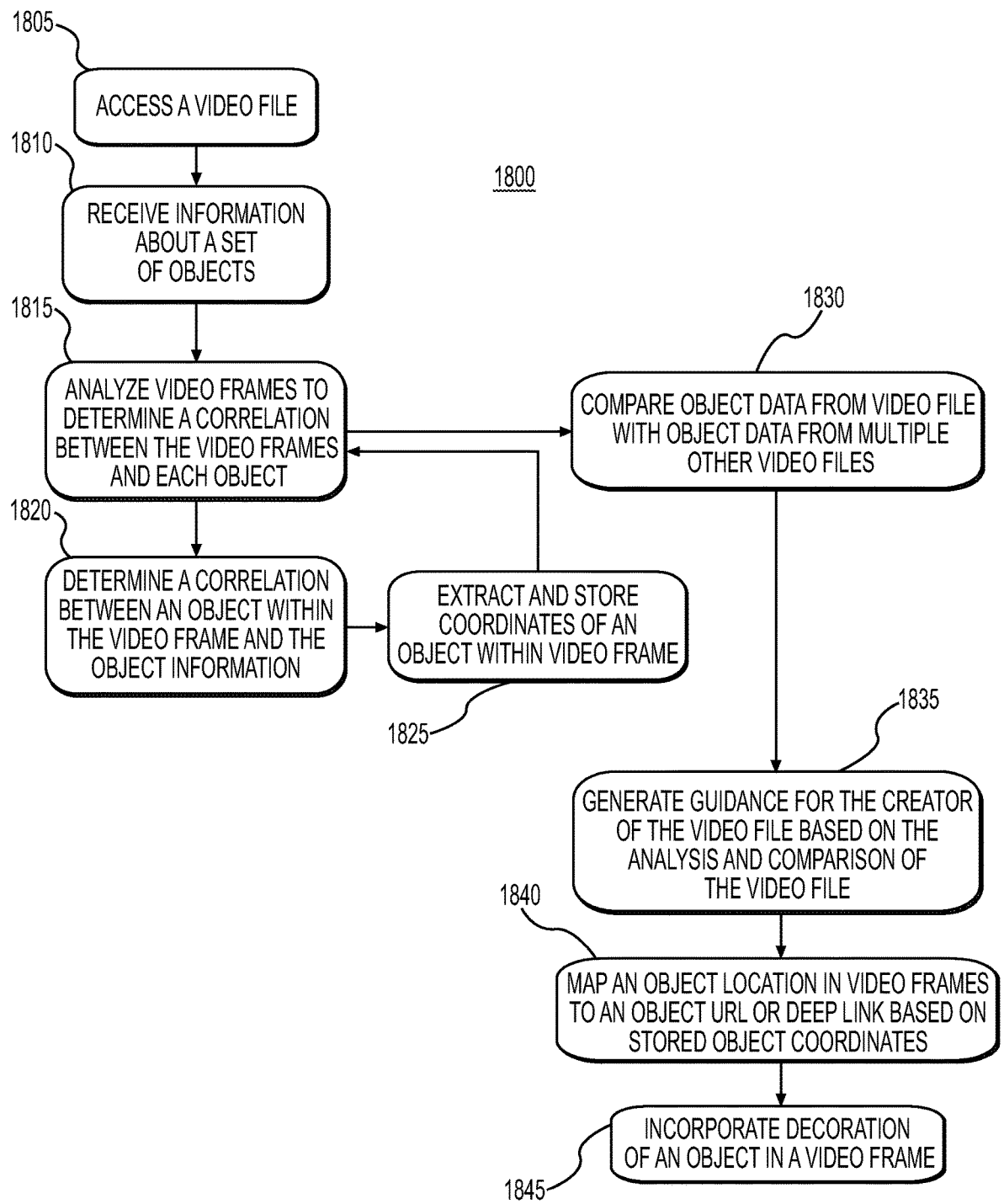
FIG. 18 depicts a flowchart of a method of ingesting and presenting a video with associated linked products and metadata as a unified actionable shopping experience, according to one or more embodiments.

FIG. 18 depicts a flowchart of a method of deriving object placement in video and optimizing video playback for object discovery, according to one or more embodiments. As shown in FIG. 18, in operation 1805, the method may access a video file. The video file may be accessed from a database, such as media repository 1510 depicted in FIG. 15. In operation 1810, the method may receive information about a set of objects. The objects may be, for example, items that a social media promoter wishes to feature or promote in a social media post, products that a manufacturer, retailer, or brand wishes to advertise, or any other type of object. In other circumstances, the object may be representative of a service provided by the social media author or another entity, that the social media author or other entity wishes to promote. The information about the object may include, for example, depiction of a physical object, such as a photograph, line drawing, or other type of depiction, or may include a brand logo, trademark, service mark, or other design. The information about the object may further include information about the object, such as a description or other identifying information, information about a source of the object or of a service represented by the object, information about rights holders for the image or a related product or service, etc. Additional metadata may be embodied as a link to a product. This link may be the result of a software tool accessing a webpage and deriving from that webpage a link to the hosting site. This link may provide a means by which the link is provided along with any products within a post. This link can also be used in creating hot spot overlays on a post's video, which when clicked on by the user may result in taking the user to the brand or retailer's product page to engage in the buying process. In addition to a link, other data such as in stock status, low stock status, price history including price drops may be included. In operation 1815, the method may analyze video frames to determine a correlation between the video frames and each object. For example a correlation may be determined between depictions of objects in the video and the retrieved object information. Alternatively, the video file may include metadata and a comparison may be made between the video file metadata and the object information. For example, the method may process each video frame with respect to each object in operations 1820 and 1825. In operation 1820, the method may determine a correlation between an object within the video frame and the object information. The determined correlation may include a location of an object determined to be depicted in the video frame. In operation 1825, the method may extract and store coordinates of an object within video frame. This operation may be performed, for example, using image recognition algorithms. When processing of all video frames has been completed, the method may continue to operation 1830. In operation 1830, the method may compare object data from video file with object data from multiple other video files. In addition to using AI and other image recognition techniques to ascertain which products are associated with a video, further comparisons may be made between unrelated videos to determine if the same, or a subset of products, are contained. These measurements may allow for content found to have related products to be selectively presented to a consumer. In operation 1835, the method may generate guidance for the creator of the video file based on the analysis and comparison of the video file. In operation 1840, the method may map an object location in video frames to an object URL or deep link based on stored object coordinates. This may include using the coordinate data derived from the image recognition algorithm and create metadata for the video, possibly in frame-wise fashion, to map a uniform resource locator (URL) or other link to a product, thus potentially allowing a user obtain further information about the object, such as options for purchasing, by interacting with the object within the video display, such as by simply touching, clicking, or selecting the object or product shown in the video. Finally, in operation 1845, the method may incorporate decoration of an object in a video frame. These decorations may be, for example, bounding boxes, glitter effects, highlighting effects, etc.

The disclosed methods, according to one or more embodiments, may allow promoters, such as social media authors or influencers, to analyze object placement in videos and may provide guidance to enhance the performance of such videos, thus, potentially increasing the effectiveness of the produced videos in promoting items and marketing products and services.

Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A computer-implemented method for ingesting and presenting a video with associated linked products and metadata as a unified actionable shopping experience, the method comprising:
   accessing a video file;
   receiving information about an object depicted in a frame of the video file;
   generating guidance for a creator of the video file based on a correlation between the frame of the video file and the information about the object; and
   delivering the video file to consumers.

2. The computer-implemented method of claim 1, further comprising:
   determining the correlation between the frame of the video and the information about the object by determining a correlation between the object within the video frame and the information about the object, and extracting and storing coordinates of the object within the video frame.

3. The computer-implemented method of claim 2, further comprising:
   mapping the coordinates of the object within the video frame to an external address, the external address being a link to a merchant portal or web page through which the object may be purchased.

4. The computer-implemented method of claim 3, wherein a user interaction with the object within the video frame provides the user with further information about the object.

5. The computer-implemented method of claim 3, further comprising:
   combining the video file and information about the object into a social media post,
   wherein delivering the video file to the consumers comprises delivering the social media post to the consumers.

6. The computer-implemented method of claim 2, further comprising:
incorporating a decoration of the object in the video frame.

7. The computer-implemented method of claim 6, wherein the decoration is one of a bounding box, glitter effects, or highlighting effects.

8. A system for ingesting and presenting a video with associated linked products and metadata as a unified actionable shopping experience, the system comprising:
a data storage device storing instructions in an electronic storage medium; and
a processor configured to execute the instructions to perform operations including:
accessing a video file;
receiving information about an object depicted in a frame of the video file;
generating guidance for a creator of the video file based on a correlation between the frame of the video file and the information about the object; and
delivering the video file to consumers.

9. The system of claim 8, wherein the operations further include:
determining the correlation between the frame of the video and the information about the object by determining a correlation between the object within the video frame and the information about the object, and extracting and storing coordinates of the object within the video frame.

10. The system of claim 9, wherein the operations further include:
mapping the coordinates of the object within the video frame to an external address, the external address being a link to a merchant portal or web page through which the object may be purchased.

11. The system of claim 10, wherein a user interaction with the object within the video frame provides the user with further information about the object.

12. The system of claim 9, wherein the operations further include:
incorporating a decoration of the object in the video frame.

13. The system of claim 10, wherein the operations further include:
combining the video file and information about the object into a social media post,
wherein delivering the video file to the consumers comprises delivering the social media post to the consumers.

14. A non-transitory machine-readable medium storing instructions that, when executed by a computing system, cause the computing system to perform operations for ingesting and presenting a video with associated linked products and metadata as a unified actionable shopping experience, the operations comprising:
accessing a video file;
receiving information about an object depicted in a frame of the video file;
generating guidance for a creator of the video file based on a correlation between the frame of the video file and the information about the object; and
delivering the video file to consumers.

15. The non-transitory machine-readable medium of claim 14, the operations further comprising:
determining the correlation between the frame of the video and the information about the object by determining a correlation between the object within the video frame and the information about the object, and extracting and storing coordinates of the object within the video frame.

16. The non-transitory machine-readable medium of claim 15, the operations further comprising:
mapping the coordinates of the object within the video frame to an external address, the external address being a link to a merchant portal or web page through which the object may be purchased.

* * * * *